United States Patent
Miyata

(10) Patent No.: US 9,167,581 B2
(45) Date of Patent: Oct. 20, 2015

(54) BASE STATION

(75) Inventor: Takeo Miyata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 157 days.

(21) Appl. No.: 14/119,176

(22) PCT Filed: May 24, 2012

(86) PCT No.: PCT/JP2012/063311
§ 371 (c)(1),
(2), (4) Date: Nov. 20, 2013

(87) PCT Pub. No.: WO2012/161252
PCT Pub. Date: Nov. 29, 2012

(65) Prior Publication Data
US 2014/0086206 A1    Mar. 27, 2014

(30) Foreign Application Priority Data
May 26, 2011    (JP) .................. 2011-117635

(51) Int. Cl.
*H04W 72/04*    (2009.01)
*H04W 72/12*    (2009.01)
*H04B 7/06*    (2006.01)
*H04B 7/08*    (2006.01)

(52) U.S. Cl.
CPC .......... *H04W 72/0446* (2013.01); *H04W 72/04* (2013.01); *H04B 7/0615* (2013.01); *H04B 7/0842* (2013.01); *H04W 72/12* (2013.01)

(58) Field of Classification Search
None
See application file for complete search history.

(56) References Cited

U.S. PATENT DOCUMENTS

| 8,000,273 B2 | 8/2011 | He et al. |
| 2011/0176443 A1 | 7/2011 | Astely et al. |
| 2012/0063371 A1 | 3/2012 | He et al. |
| 2013/0265960 A1* | 10/2013 | Wang et al. .................. 370/329 |

FOREIGN PATENT DOCUMENTS

| JP | 2008-99079 A | 4/2008 |
| WO | 2010/019012 A2 | 2/2010 |
| WO | 2010/019088 A1 | 2/2010 |

OTHER PUBLICATIONS

3GPP TS 36.211 V10.1.0 (Mar. 2011), Technical Specification, 3rd Generation Partnership Project; Technical Specification Group Radio Access Network; Evolved Universal Terrestrial Radio Access (E-UTRA); Physical Channels and Modulation (Release 10), Mar. 2011.
International Search Report dated Jul. 24, 2012, issued for International Application No. PCT/JP2012/063311.
International Preliminary Report on Patentability dated on Dec. 5, 2013, issued for International Application No. PCT/JP2012/063311.

* cited by examiner

*Primary Examiner* — Bob Phunkulh
*Assistant Examiner* — George Atkins, Jr.
(74) *Attorney, Agent, or Firm* — Procopio, Cory, Hargreaves & Savitch LLP

(57) ABSTRACT

A scheduling executing section calculates a predicted value of a transmission gain at a time when controlling transmission directivity in a plurality of antennas based on a known signal to be received in a frequency band of a use downlink radio resource and performing downlink communication with a communication terminal, and determines a communication terminal to which the use downlink radio resource is allocated based on the predicted value.

5 Claims, 22 Drawing Sheets

F I G . 4

| CONSTITUTION NUMBER | SUB-FRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

F I G . 7
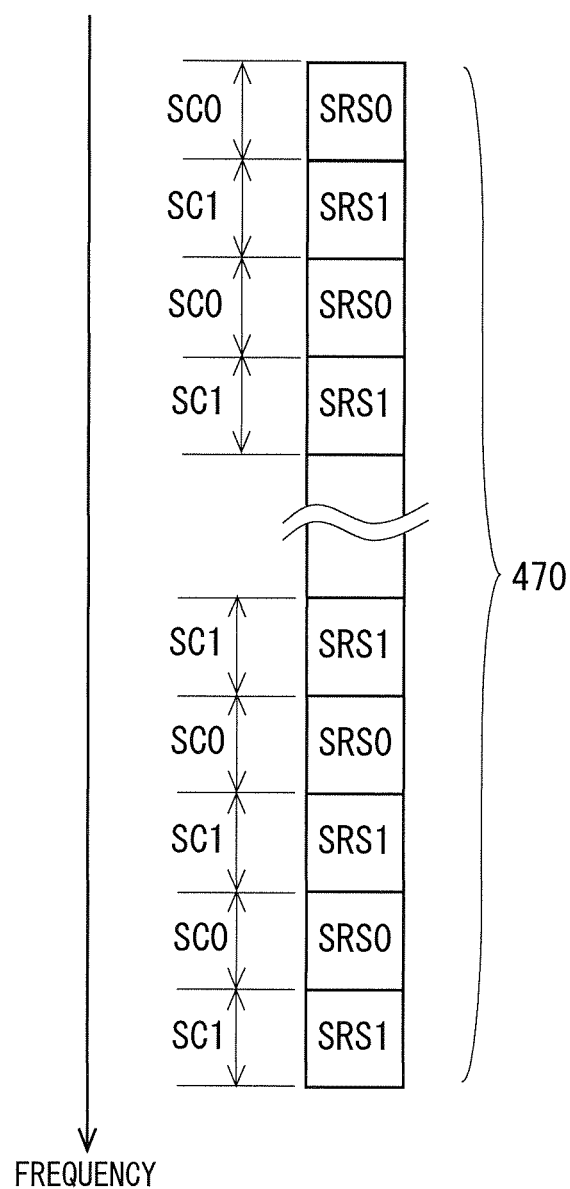
FREQUENCY

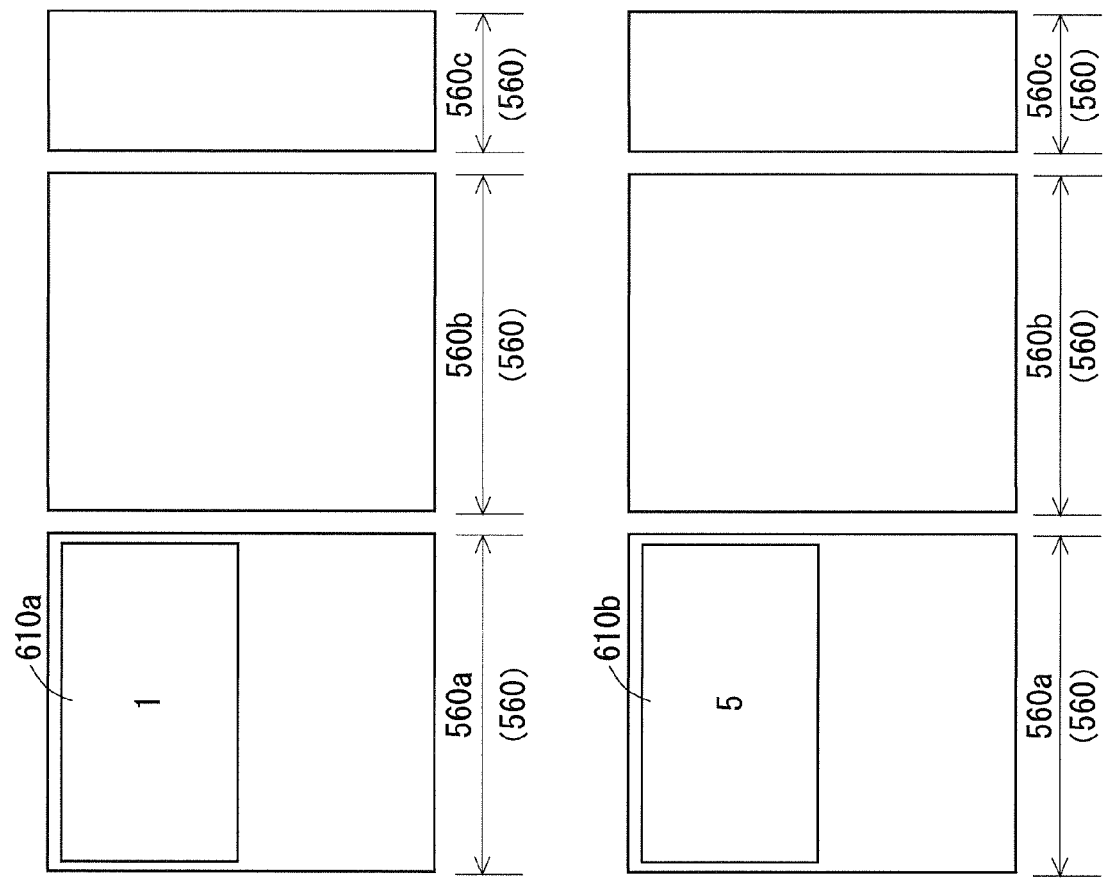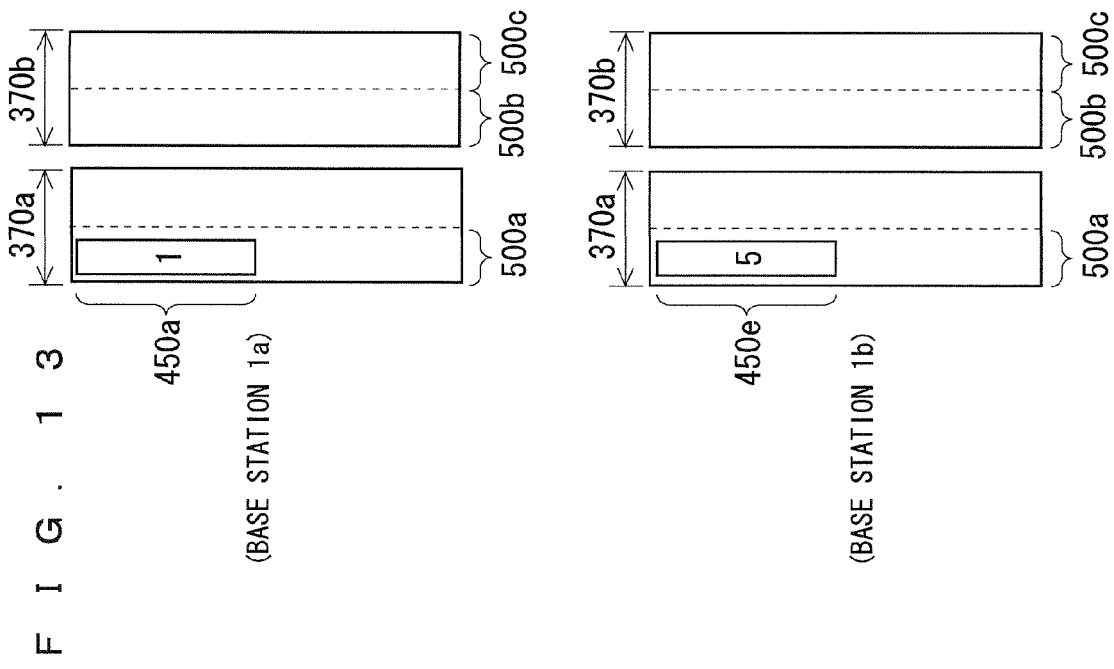
FIG. 13

F I G. 1 4
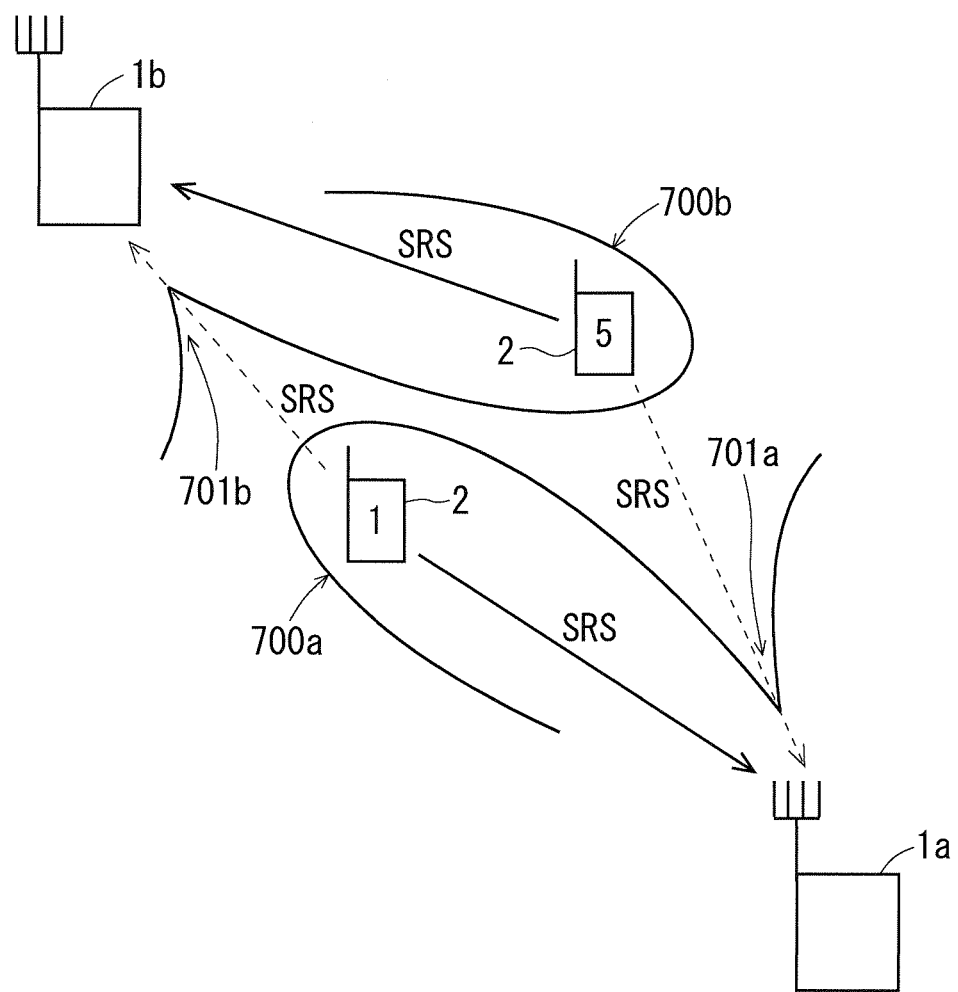

FIG. 16
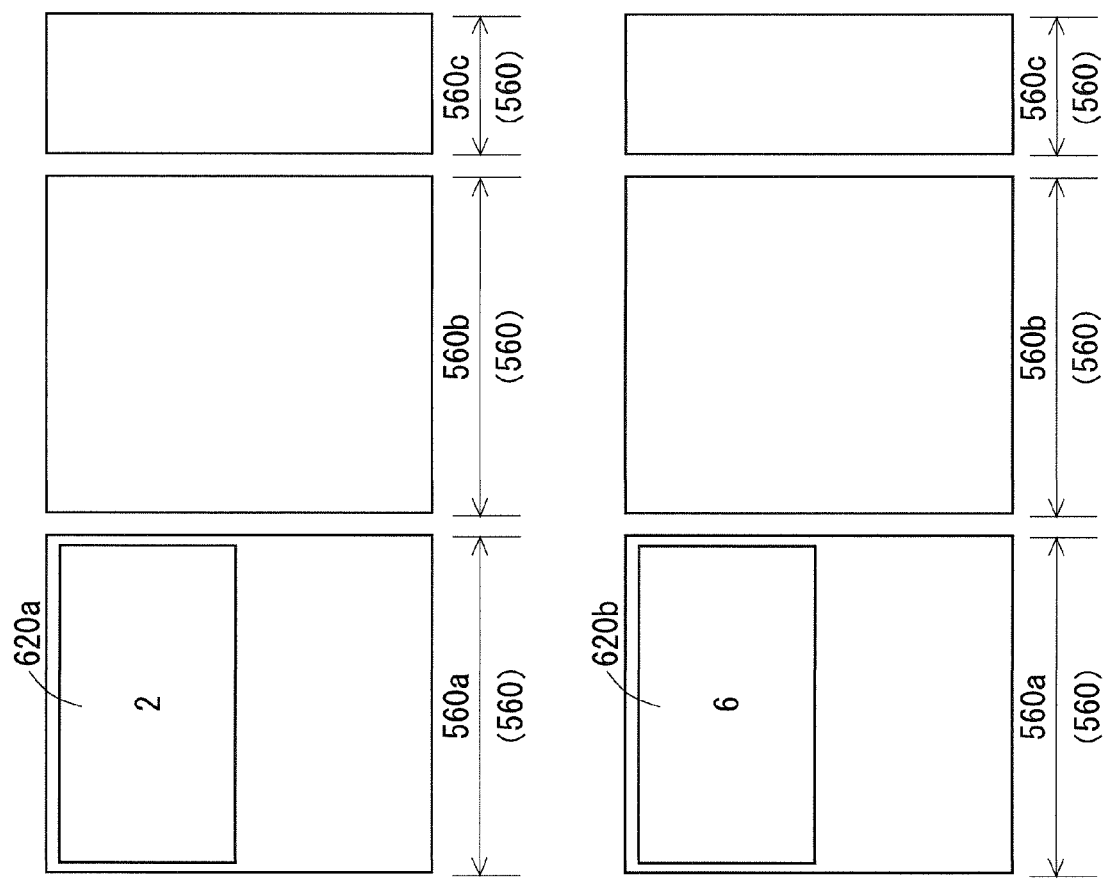
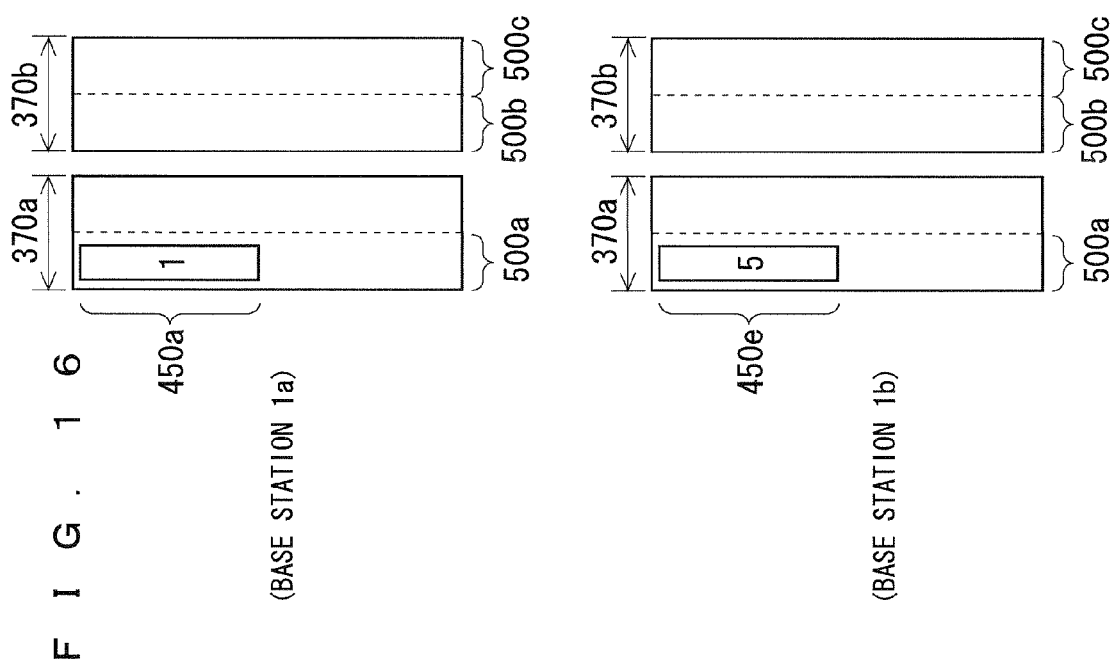

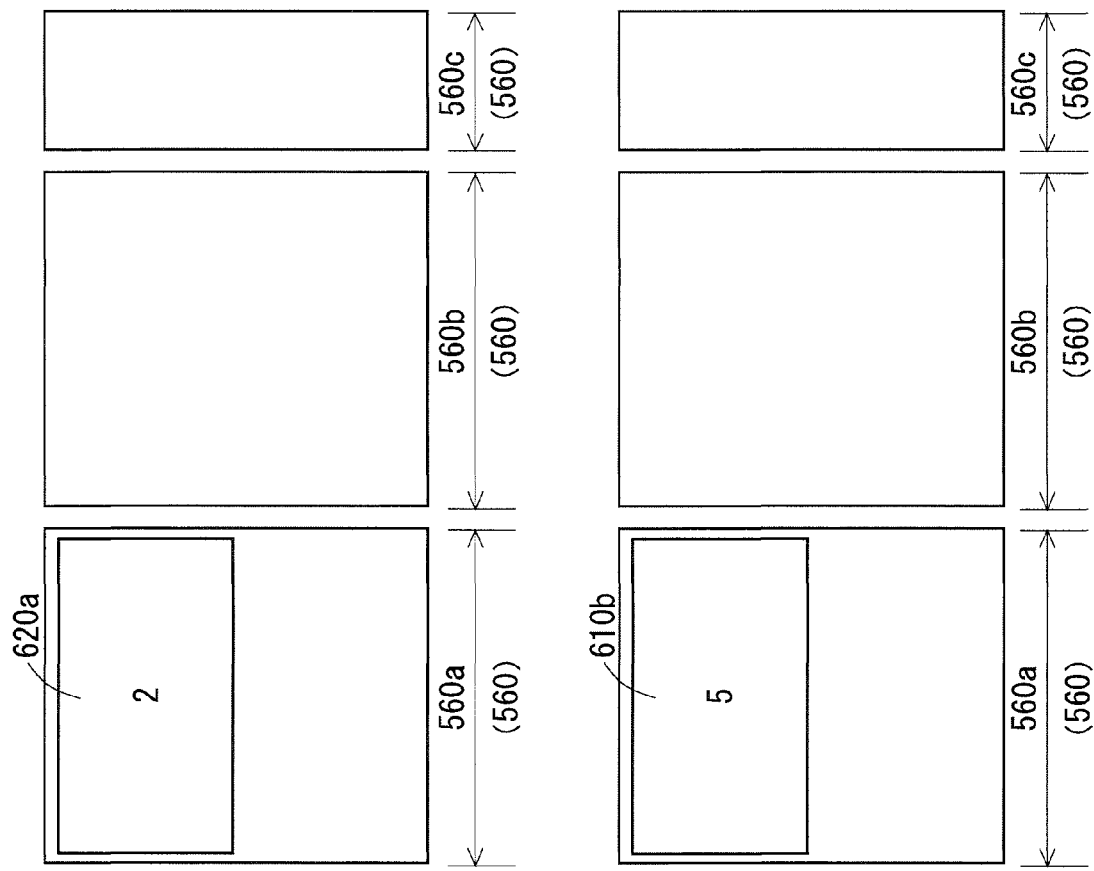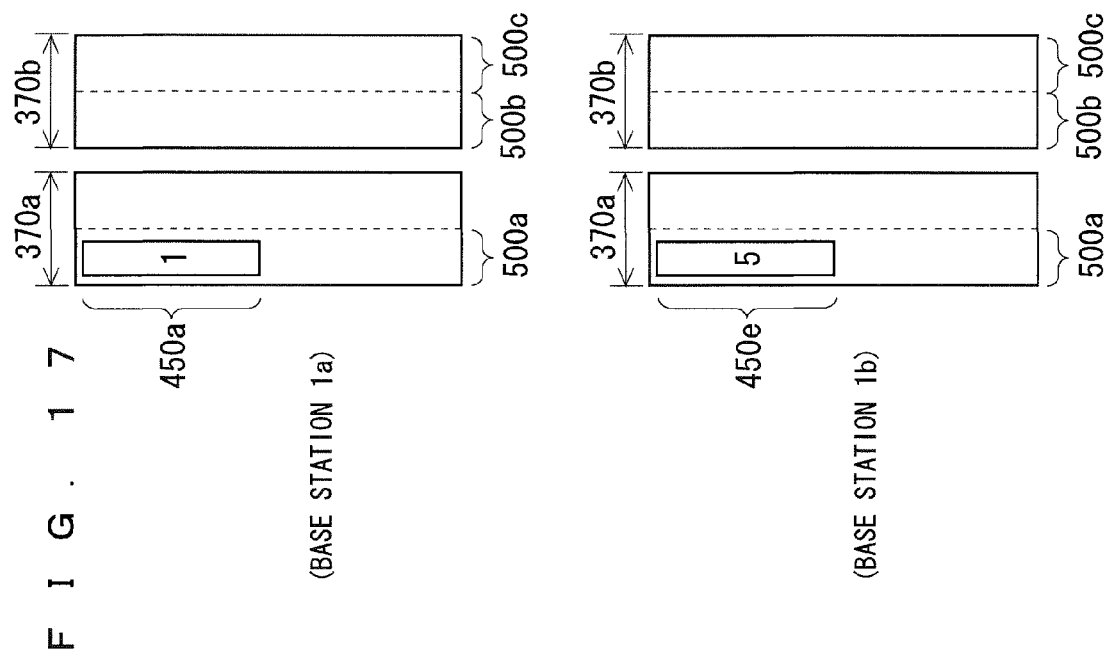
FIG. 17

BASE STATION

TECHNICAL FIELD

The present invention relates to a base station that communicates with a communication terminal using a plurality of antennas.

BACKGROUND ART

A variety of techniques related to radio communication have been conventionally proposed. A technique relating to LTE (Long Term Evolution) is disclosed in Patent Document 1, for example. LTE is referred to also as "E-UTRA".

PRIOR ART DOCUMENT

Patent Document

Patent Document 1: Japanese Patent Application Laid-Open No. 2008-099079

SUMMARY OF THE INVENTION

Problems to be Solved by the Invention

In base stations of LTE communication systems and the like, an adaptive array antenna system for adaptively controlling directivity in a plurality of antennas is occasionally adopted.

On the other hand, improvement in transmission performance is desired in the base stations.

Therefore, the present invention is devised in view of the above point, and its object is to provide a technique that is capable of controlling transmission directivity in the plurality of antennas and improving a transmission performance of a base station communicating with a communication terminal.

Means for Solving the Problems

A base station according to a certain aspect for communicating with a communication terminal includes a communication section for communicating with a communication terminal using a plurality of antennas and controlling transmission directivity in the plurality of antennas when downlink communication with a communication terminal is performed, and a scheduling executing section for determining the communication terminal for downlink communication and the allocating a use downlink radio resource to be used by the communication section for the downlink communication with the communication terminal to the communication terminal, wherein an uplink radio resource for a known signal which is capable of being used when a communication terminal transmits a known signal, and a downlink radio resource, which is associated with the uplink radio resource for the known signal and is capable of being used when the communication section performs downlink communication with a communication terminal are determined, wherein when the scheduling executing section allocates, to a communication terminal, the use downlink radio resource including in a frequency direction a frequency band included in a transmission frequency band of the known signal received by at least a part of the uplink radio resource for the known signal, the scheduling executing section executes an allocating process for allocating the use downlink radio resource from the downlink radio resource associated with the uplink radio resource for the known signal to the communication terminal, wherein when the communication section performs the downlink communication with a communication terminal using the use downlink radio resource which is allocated to the communication terminal by executing the allocating process by the scheduling executing section, the communication section controls the transmission directivity in the plurality of antennas based on the known signal to be received in the frequency band of the use downlink radio resource in the uplink radio resource for the known signal, wherein when the scheduling executing section allocates the use downlink radio resources to a communication terminal in the allocating process, the scheduling executing section calculates an predicted value of a transmission gain at a time when the communication section controls the transmission directivity in the plurality of antennas based on the known signal to be received in the frequency band of the use downlink radio resource in the uplink radio resource for the known signal and performs the downlink communication with the communication terminal, and determines a communication terminal to which the use downlink radio resource is allocated based on the predicted value.

Effects of the Invention

According to the present invention, the transmission performance of the base station can be improved.

These and other objects, features, aspects and advantages of the present invention will become more apparent from the following detailed description of the present invention when taken in conjunction with the accompanying drawings.

BRIEF DESCRIPTION OF DRAWINGS

FIG. 4 is a diagram illustrating the types of configurations of the TDD frame.

FIG. 7 is a diagram illustrating an SRS0 and an SRS1.

FIG. 13 is a diagram illustrating an allocation example of the downlink radio resources in a base station and a neighboring base station.

FIG. 14 is a diagram illustrating one example of transmission directivity in the base station and the neighboring base station.

FIG. 16 is a diagram illustrating an allocation example of the downlink radio resources in the base station and the neighboring base station.

FIG. 17 is a diagram illustrating an allocation example of the downlink radio resources in the base station and the neighboring base station.

EMBODIMENT FOR CARRYING OUT THE INVENTION

Figure 1:
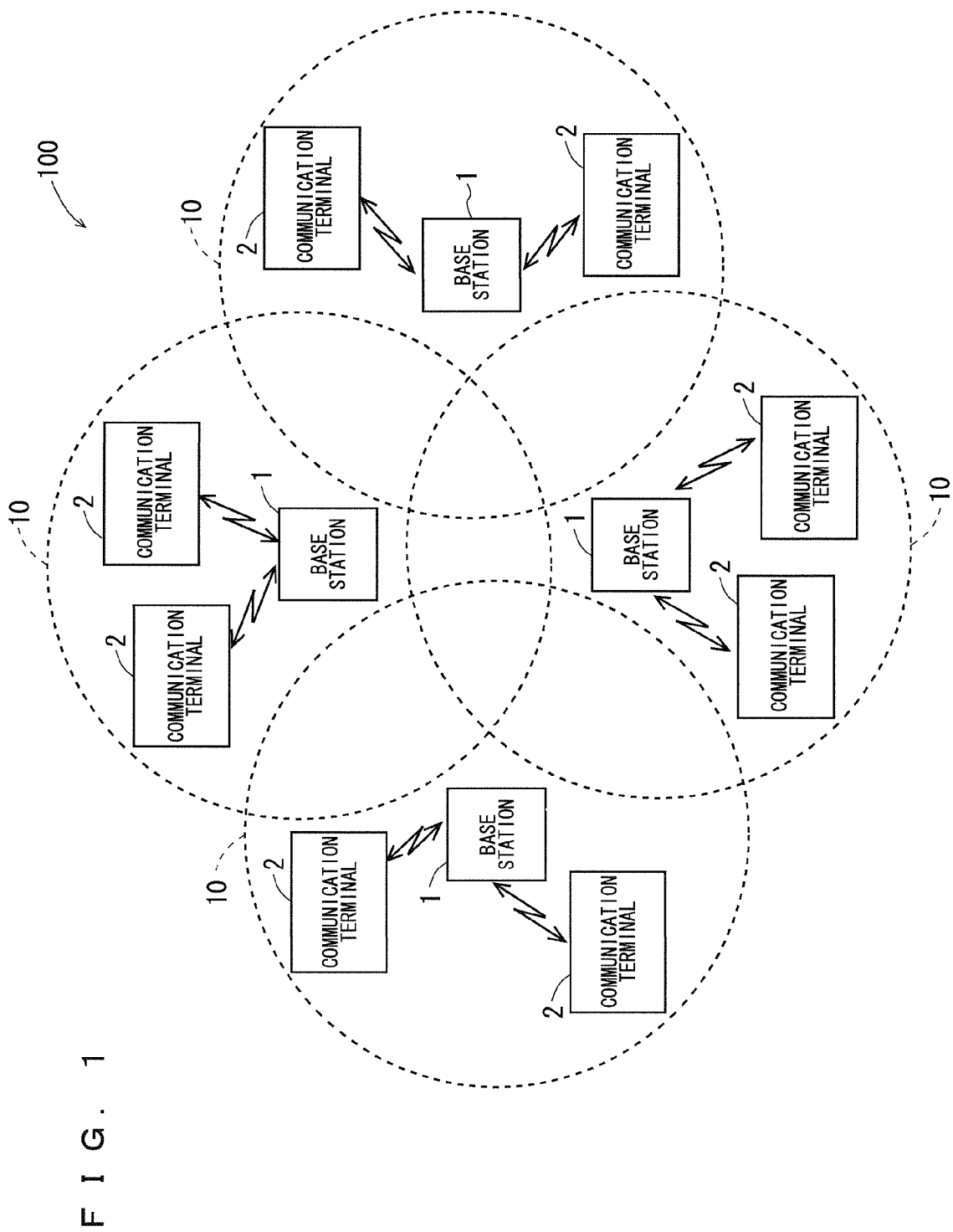
FIG. 1 is a diagram illustrating a configuration of a communication system according to an embodiment of the present invention.

FIG. 1 is a diagram illustrating a configuration of a communication system 100 according to the embodiment of the present invention. The communication system 100 is, for example, LTE in which a TDD (Time Division Duplexing) system is adopted as a duplex system, and includes a plurality of base stations 1. Each of the base stations 1 performs communication with the plurality of communication terminals 2. In LTE, an OFDMA (Orthogonal Frequency Division Multiple Access) system is used for downlink communication, and an SC-FDMA (Single Carrier-Frequency Division Multiple Access) system is used for uplink communication. Thus, the OFDMA system is used for transmission from the base stations 1 to the communication terminals 2, and the SC-FDMA system is used for transmission from the communication terminals 2 to the base stations 1. An OFDM (Orthogonal Frequency Division Multiplexing) signal in which a plurality of sub-carriers orthogonal to each other is combined together is used in the OFDMA system.

As shown in FIG. 1, each of the base stations 1 has a service area 10 which partially overlaps service areas 10 of its neighboring base stations 1. In FIG. 1, only two or three neighboring base stations 1 are present for each of the base stations 1 because only four base stations 1 are shown. In actuality, six neighboring base stations 1, for example, may be present for each of the base stations 1.

The plurality of base stations 1 is connected to a network, not shown, and is capable of performing communications with each other via the network. Further, a server device, not shown, is connected to the network. Each of the base stations 1 is communicable with the server device via the network.

Figure 2:
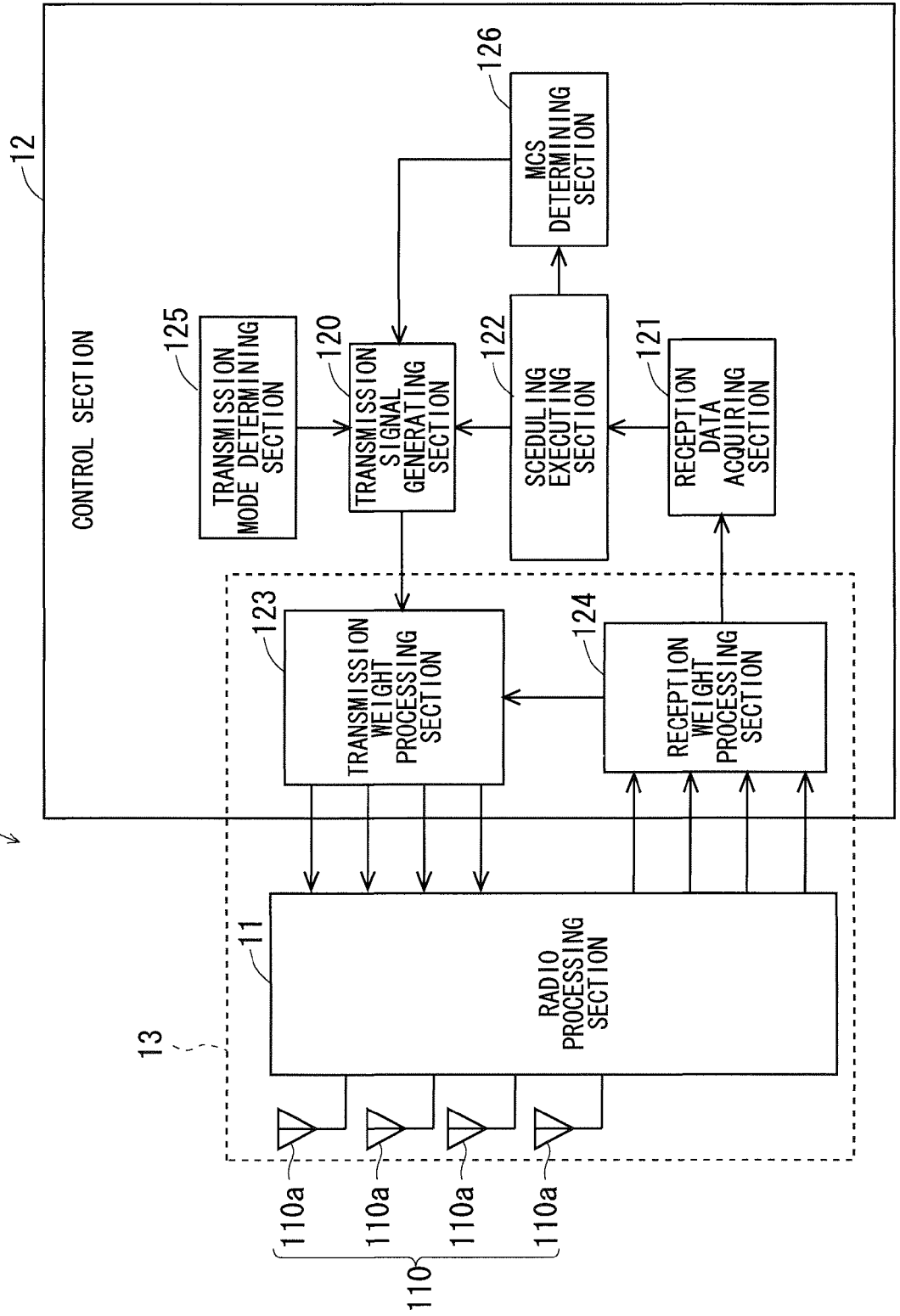
FIG. 2 is a diagram illustrating a configuration of a base station according to the embodiment of the present invention.

FIG. 2 is a diagram illustrating a configuration of each of the base stations 1 according to an embodiment of the present invention. The base station 1 is capable of performing communications with the plurality of communication terminals 2 at the same time by individually allocating radio resources identified in two-dimensions composed of a time axis and a frequency axis to the plurality of communication terminals 2, respectively. The base station 1 includes an array antenna as transmitting and receiving antennas, and is capable of controlling the directivity of the array antenna by using an adaptive array antenna system.

As shown in FIG. 2, the base station 1 includes a radio processing section 11, and a control section 12 for controlling the radio processing section 11. The radio processing section 11 includes an array antenna 110 composed of a plurality of antennas 110a. The radio processing section 11 performs an amplification process, down-converting, an A/D conversion process and the like on a plurality of reception signals received by the array antenna 110 to generate and output a plurality of baseband reception signals.

The radio processing section 11 also performs a D/A conversion process, up-converting, an amplification process and the like on each of a plurality of baseband transmission signals generated by the control section 12 to generate a plurality of carrier-band transmission signals. The radio processing section 11 then inputs the generated carrier-band transmission signals to the plurality of antennas 110a constituting the array antenna 110, respectively. Thus, the transmission signals are transmitted from the antennas 110a by radio.

The control section 12 includes a CPU (Central Processing Unit), a DSP (Digital Signal Processor), a memory and the like. In the control section 12, the CPU and the DSP execute programs stored in the memory, so that a plurality of functional blocks are formed which includes a transmission signal generating section 120, a reception data acquiring section 121, a scheduling executing section 122, a transmission weight processing section 123, a reception weight processing section 124, a transmission mode determining section 125, an MCS determining section 126 and the like.

The MCS determining section 126 determines an MCS (Modulation and Coding Scheme) that is applied to transmission signal to be transmitted to the communication terminal 2 by the base station 1. The MCS indicates a combination of a modulation system such as QPSK (Quadrature Phase Shift Keying) or 16 QAM (Quadrature Amplitude Modulation) and a coded rate of an error correcting code. The MCS determining section 126 determines the MCS that is applied to a transmission signal to be transmitted to the communication terminal 2 based on transmission path characteristics (radio characteristics) in a downlink direction between the base station 1 and the communication terminal 2 in a frequency band of the transmission signal.

The transmission signal generating section 120 generates transmission data to be transmitted to the communication terminal 2 being a target of communication. The transmission data includes control data and user data. The transmission signal generating section 120 generates a transmission signal of a base band including generated transmission data based on the MCS determined by the MCS determining section 126. The transmission signals to be generated are equal in number to the plurality of the antennas 110a constituting the array antenna 110.

The transmission weight processing section 123 sets a plurality of transmission weights for controlling the transmission directivity of the array antenna 110 respectively to the plurality of transmission signals generated by the transmission signal generating section 120. The transmission weight processing section 123 then performs an inverse discrete Fourier transform (IDFT) and the like on the plurality of transmission signals to which the respective transmission weights are set, and thereafter outputs the plurality of transmission signals to the radio processing section 11.

The reception weight processing section 124 performs a discrete Fourier transform (DFT) on the plurality of reception signals input from the radio processing section 11, and thereafter sets a plurality of reception weights for controlling reception directivity in the array antenna 110 respectively to the plurality of reception signals. The reception weight processing section 124 then synthesizes the plurality of reception signals to which the plurality reception weights are set so as to generate a new reception signal (referred to hereinafter as a "synthesized reception signal").

The reception data acquiring section 121 performs the inverse discrete Fourier transform, a demodulation process and the like on the synthesized reception signal generated by the reception weight processing section 124 to acquire the control data and the user data included in the synthesized reception signal.

The radio processing section 11, the transmission weight processing section 123 and the reception weight processing section 124 in the base station 1 according to the embodiment constitute a communication section 13 for performing communications with the plurality of communication terminals 2 while adaptively controlling the directivity of the array antenna 110. When performing communications with the communication terminals 2, the communication section 13 controls the reception directivity and the transmission directivity of the array antenna 110. Specifically, the communication section 13 adjusts the reception weights by which the reception signals are multiplied in the reception weight processing section 124 to thereby set beam and null of the reception directivity of the array antenna 110 in various directions. Further, the communication section 13 adjusts the transmission weights by which the transmission signals are multiplied in the transmission weight processing section 123 to thereby set beam and null of the transmission directivity of the array antenna 110 in various directions. The transmission weights may be determined from the reception weights, and the reception weights may be determined based on the known signals from the communication terminals 2.

The scheduling executing section 122 determines the communication terminal 2 which performs downlink communication of data, and allocates the downlink radio resource (referred to hereinafter as a "use downlink radio resource") to be used for data downlink communication with the communication terminal 2 to the communication terminal 2. Hereinafter, scheduling for allocating use downlink radio resources to the communication terminal 2, the scheduling performed by the scheduling executing section 122 is simply referred to as "downlink scheduling". The transmission signal generating section 120 generates a transmission signal including data to be transmitted to the communication terminal 2 based on the use downlink radio resource allocated to the communication terminal 2 by the scheduling executing section 122, and inputs the transmission signal to the transmission weight processing section 123 at a time based on the use downlink radio resource. Thus, the transmission signal including the data to be transmitted to the communication terminal 2 is transmitted from the communication section 13 by using the use downlink radio resource allocated to the communication terminal 2. The transmission signal generating section 120 generates and outputs a transmission signal including the control data for notifying the communication terminal 2 about the use downlink radio resource allocated to the communication terminal 2 by the scheduling executing section 122. This allows the communication terminal 2 to know the use downlink radio resource to be used in the transmission of data thereto, thereby receiving data from the base station 1 thereto appropriately.

Further, the scheduling executing section 122 determines the communication terminal 2 that performs uplink communication of data, and allocates an uplink radio resource (referred to hereinafter as a "use uplink radio resource") to be used for data uplink communication with the communication terminal 2 to the communication terminal 2. The transmission signal generating section 120 generates and outputs a transmission signal including control data for notifying the communication terminal 2 about the use uplink radio resource allocated to the communication terminal 2 by the scheduling executing section 122. This allows the communication terminal 2 to know the use uplink radio resource to be used in the transmission of data to the base station 1, thereby transmitting the data to the base station 1 by radio through the use uplink radio resource.

The transmission mode determining section 125 determines a transmission mode (a transmission frequency band, a transmission cycle and the like) of a sounding reference signal (SRS), described later, which is a known signal to be transmitted by the communication terminal 2. The transmission signal generating section 120 generates and outputs a transmission signal including control data for notifying the communication terminal 2 about the transmission mode of the SRS to be transmitted by the communication terminal 2 which is determined by the transmission mode determining section 125. As a result, the communication terminal 2 can get the transmission mode (the transmission frequency band, the transmission cycle and the like) of the SRS to be transmitted therefrom, and transmits the SRS to the base station 1 based on the transmission mode.

<Configuration of TDD Frame>

Next, a TDD frame 300 to be used between the base station 1 and the communication terminal 2 is described. The TDD frame 300 is specified in a two-dimension composed of a time axis and a frequency axis. A frequency bandwidth (system bandwidth) of the TDD frame 300 is, for example, 10 MHz. The time length of the TDD frame 300 is 10 ms. The base station 1 determines the use uplink radio resources and use downlink radio resources to be allocated from the TDD frames 300 to the communication terminals 2.

Figure 3:
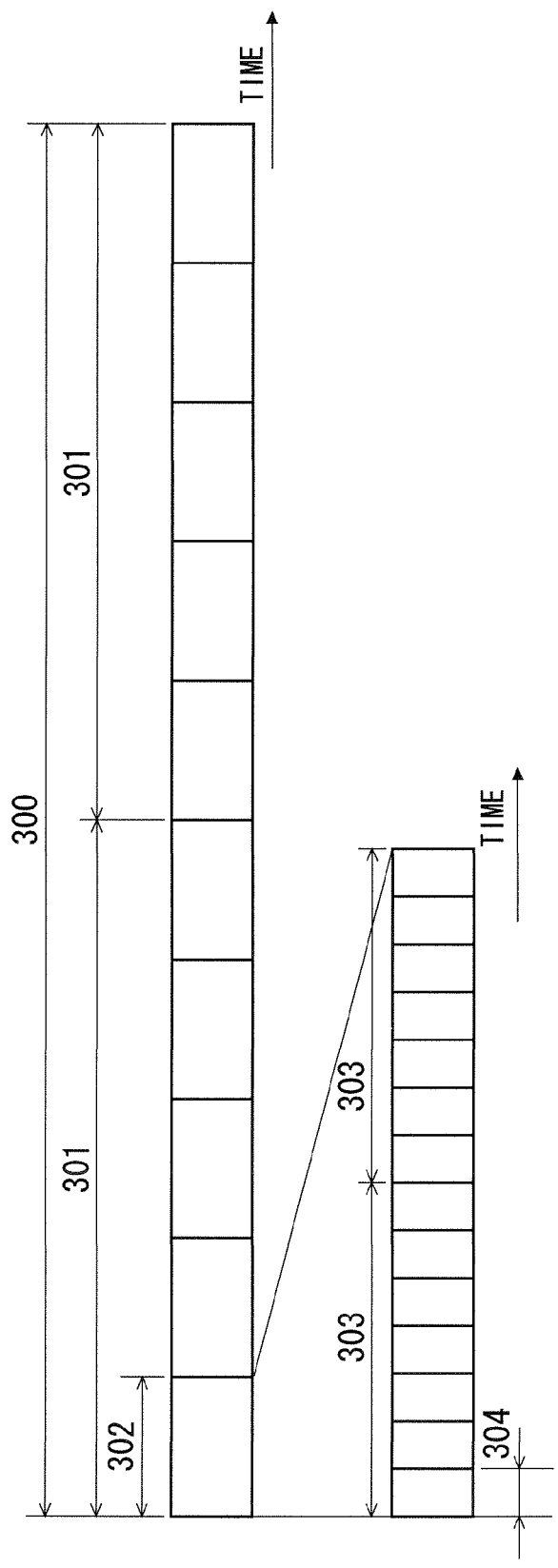
FIG. 3 is a diagram illustrating a configuration of a TDD frame.

FIG. 3 is a diagram illustrating a configuration of the TDD frame 300. As shown in FIG. 3, the TDD frame 300 is composed of two half frames 301. Each of the half frames 301 is composed of five sub-frames 302. That is to say, the TDD frame 300 is composed of ten sub-frames 302. The time length of each of the sub-frames 302 is 1 ms. The ten sub-frames 302 constituting the TDD frame 300 are hereinafter referred to as zeroth to ninth sub-frames 302 in order from the leading end in some cases.

Each of the sub-frames 302 includes two slots 303 arranged in the time direction. Each of the slots 303 is composed of seven symbol periods 304. Therefore, each of the sub-frames 302 includes 14 symbol periods 304 arranged in the time direction. Such a symbol period 304 serves as one symbol period for an OFDM symbol in the downlink communication of the OFDMA system, and serves as one symbol period for a DFTS (Discrete Fourier Transform Spread)-OFDM symbol in the uplink communication of the SC-FDMA system.

The TDD frame 300 having the aforementioned configuration includes a sub-frame 302 for uplink communication only, and a sub-frame 302 for downlink communication only. The sub-frame 302 for uplink communication only is referred to as an "uplink sub-frame 302" and the sub-frame 302 for downlink communication only is referred to as a "downlink sub-frame 302" hereinafter. The communication terminal 2 transmits data to the base station 1 in the uplink sub-frame 302, and the base station 1 transmits data to the communication terminals 2 in the downlink sub-frame 302.

In LTE, a region (radio resource) of the TDD frame 300 which includes a frequency bandwidth of 180 kHz in a frequency direction and includes seven symbol periods 304 (one slot 303) in a time direction is referred to as a "resource block (RB)". The resource block includes 12 sub-carriers. When allocating a use uplink radio resource to a communication terminal 2 or when allocating a use downlink radio resource to a certain communication terminal 2, the scheduling executing section 122 allocates the use uplink radio resource or the use downlink radio resource to the communication terminal 2 in units of two consecutive resource blocks, i.e., for each sub-frame 302, in the time direction and in units of one resource block in the frequency direction. When a plurality of resource blocks is allocated in the frequency direction to a certain communication terminal 2 in the uplink sub-frame 302, a plurality of resource blocks consecutive in the frequency direction is allocated to the communication terminal 2 because the SC-FDMA system is used in the uplink communication.

In LTE, seven types of configurations of the TDD frame 300 are specified. The configurations have different combinations of the uplink sub-frames 302 and the downlink sub-frames 302. FIG. 4 is a diagram illustrating the seven types of configurations.

As shown in FIG. 4, zeroth to sixth configurations of the TDD frames 300 are specified in LTE. In this communication system 100, one of the seven types of configurations is used. In FIG. 4, the sub-frame 302 denoted by "D" means the downlink sub-frame 302, and the sub-frame 302 denoted by "U" means the uplink sub-frame 302. Further, the sub-frame 302 denoted by "S" means the sub-frame 302 in which switching from the downlink communication to the uplink communication is done in the communication system 100. The sub-frame 302 of this type is referred to as a "special sub-frame 302".

For example, in the TDD frame 300 having the zeroth configuration, the zeroth and fifth sub-frames 302 are the downlink sub-frames 302, the second to fourth sub-frames 302 and the seventh to ninth sub-frames 302 are the uplink sub-frames 302, and the first and sixth sub-frames 302 are the special sub-frames 302. Further, in the TDD frame 300 having the fourth configuration, the zeroth sub-frame 302 and the fourth to ninth sub-frames 302 are the downlink sub-frames 302, the second and third sub-frames 302 are the uplink sub-frames 302, and the first sub-frame 302 is the special sub-frame 302.

Figure 5:
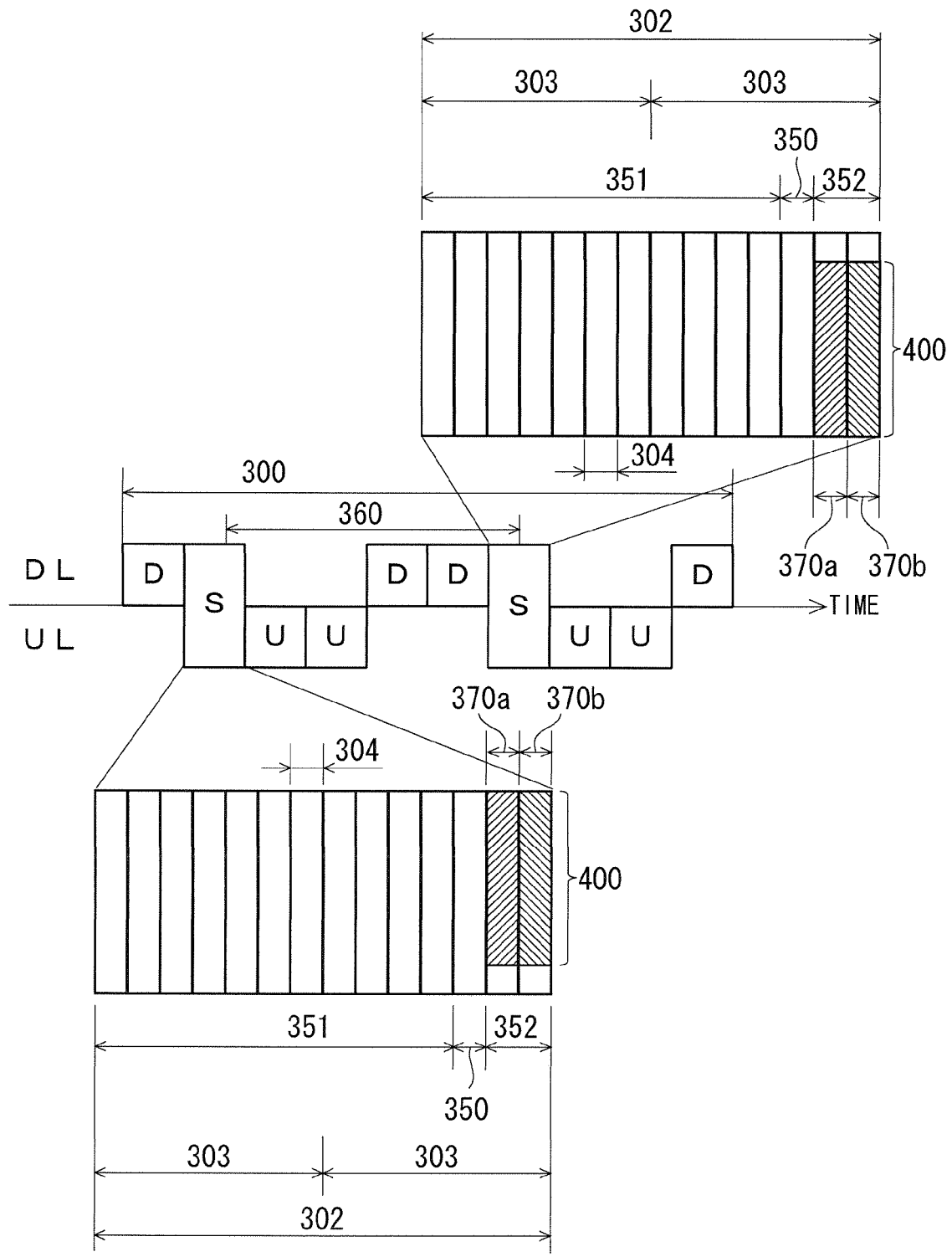
FIG. 5 is a diagram illustrating the details of the configuration of the TDD frame.

FIG. 5 is a diagram illustrating details of the configuration of the TDD frame 300 having the first configuration. As shown in FIG. 5, the special sub-frame 302 includes a downlink pilot time slot (DwPTS) 351, a guard time (GP) 350, and an uplink pilot time slot (UpPTS) 352 in the time direction. The guard time 350 is a no-signal time period required for the switching from the downlink communication to the uplink communication, and is not used for communication. In the following description, the TDD frame 300 having the first configuration shall be used in the communication system 100.

A plurality of types of combinations of time lengths composed of the downlink pilot time slot 351, the guard time 350 and the uplink pilot time slot 352 are specified in LTE. In the example of FIG. 5, the time length of the downlink pilot time slot 351 is set to 11 symbol periods 304, and the time length of the uplink pilot time slot 352 is set to 2 symbol periods 304.

In the communication system 100 according to the embodiment, the downlink communication is allowed to be performed not only in the downlink sub-frame 302 but also in the downlink pilot time slot 351 of the special sub-frame 302. Further, in this communication system 100, the uplink communication is allowed to be performed not only in the uplink sub-frame 302 but also in the uplink pilot time slot 352 of the special sub-frame 302.

In the embodiment, the base station 1 transmits data to the communication terminal 2 in each of the symbol periods 304 of the downlink pilot time slot 351. Each of the communication terminals 2 transmits a known signal referred to as the SRS in one of the two symbol periods 304 of the uplink pilot time slot 352. The SRS is composed of a plurality of complex symbols which modulate a plurality of sub-carriers. Hereinafter, the complex symbols included in the SRS are referred to as "SRS symbols". In the embodiment, the SRS to be transmitted in the uplink pilot time slot 352 is used for calculation of the transmission weight. In other words, the communication section 13 of the base station 1 is capable of controlling transmission directivity of array antenna 110 based on the SRS to be transmitted by the communication terminal 2 in the uplink pilot time slot 352. The control of the transmission directivity of the array antenna 110 is hereinafter referred to as "array transmission control".

The SRS can be transmitted in the last symbol period 304 of the uplink sub-frame 302. In other words, the communication terminal 2 is capable of transmitting data in each of the symbol periods 304 other than the last symbol period 304 of the uplink sub-frame 302, and of transmitting the SRS in the last symbol period 304. For the array transmission control, the SRS to be transmitted in the last symbol period 304 of the uplink sub-frame 302 may be used, but the SRS to be transmitted in the uplink pilot time slot 352 shall be used in the embodiment. The SRS shall mean the SRS to be transmitted by using the uplink pilot time slot 352 hereinafter unless otherwise specified. Further, a leading one of the symbol period 304 and a trailing one of the symbol period 304 included in the uplink pilot time slot 352 in which the communication terminals 2 can transmit the SRS are referred to as a "first uplink communication period for SRS 370*a*" and a "second uplink communication period for SRS 370*b*", respectively. Further, the first uplink communication period for SRS 370*a* and the second uplink communication period for SRS 370*b* are each referred to as an "uplink communication period for SRS" unless otherwise discriminated.

Each of the communication terminals 2 transmits the SRS periodically. The length of an SRS transmission cycle (transmission interval) can be changed. The transmission cycle of the SRS is referred to as an "SRS transmission cycle 360", hereinafter. In the example of FIG. 5, the length of the SRS transmission cycle 360 (transmission interval) in each of the communication terminals 2 is set to 5 ms. Therefore, in the example of FIG. 5, each of the communication terminals 2 transmits the SRS in each of the uplink pilot time slots 352 of the uplink special sub-frame 302.

<Transmission Frequency Band of SRS>

In the communication system 100, for each of the communication terminals 2, frequency bands 400 (hereinafter referred to as "SRS transmittable bands 400") which can be used for transmission of SRS by each of the communication terminals 2 are arranged alternately on a high-frequency side and a low-frequency side of the system band in every SRS transmission cycle 360 for the communication terminals 2. In FIG. 5, the SRS transmittable band 400 of the communication terminal 2 in which the length of the SRS transmission cycle 360 is 5 ms and SRS is transmitted in the first uplink communication period for SRS 370*a* is diagonally shaded from bottom left to top right. Further, the SRS transmittable band 400 of the communication terminal 2 in which the length of the SRS transmission cycle 360 is 5 ms and SRS is transmitted in the second uplink communication period for SRS 370*b* is diagonally shaded from top left to bottom right. When the system bandwidth is 10 MHz, the SRS transmittable band 400 is a frequency band for 40 resource blocks (180 kHz×40). In this embodiment, for example, the SRS transmittable bands 400 are arranged on the same place in the system band among the plurality of communication terminals 2 that transmits the SRS in the uplink pilot time slot 352 of one special sub-frame 302. That is to say, the SRS transmittable bands 400 in the same band are set for the plurality of communication terminals 2 that transmits the SRS in the uplink pilot time slot 352 of one special sub-frame 302.

Further, in the communication system 100 according to this embodiment, a frequency band (referred to hereinafter as an "SRS transmission band") used by one communication terminal 2 for one transmission of the SRS is allowed to be changed in each SRS transmission cycle 360 within the entire or partial range of the SRS transmittable band 400. Such control is referred to as "frequency hopping". The bandwidth (referred to as hereinafter an "SRS transmission bandwidth") of the SRS transmission band 450 is variable in this communication system 100.

Figure 6:
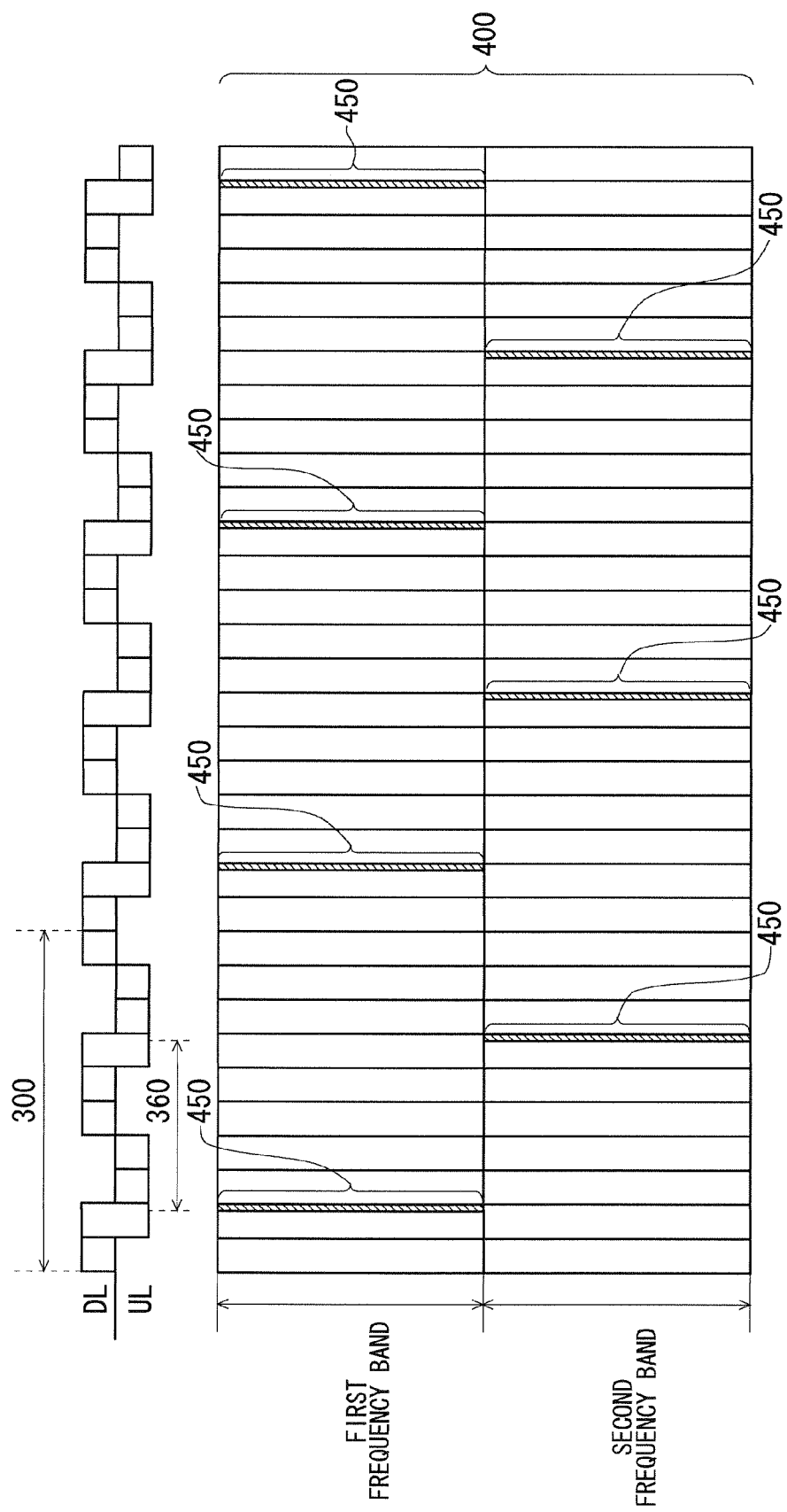
FIG. 6 is a diagram illustrating an example in which an SRS transmission band is frequency-hopped.

FIG. 6 is a diagram illustrating an example of the frequency hopping of the SRS transmission band 450 used by a certain communication terminal 2 within the entire range of the SRS transmittable band 400. Hereinafter, the communication terminal 2 being a target of the description is referred to as a "target communication terminal 2". In the example of FIG. 6, the length of the SRS transmission cycle 360 for the target communication terminal 2 is set to 5 ms, and the SRS transmittable band 400 is divided into first and second frequency bands in the target communication terminal 2. The SRS transmission band 450 having a bandwidth which is one half of the bandwidth of the SRS transmittable band 400 changes in each SRS transmission cycle 360 alternately between the first and second frequency bands.

The SRS transmission band 450 may be fixed to a constant frequency band without the frequency hopping. In other words, each of the communication terminals 2 is capable of cyclically transmitting the SRS having a constant transmission frequency band.

<Configuration of SRS>

In the communication system 100 according to the embodiment, two kinds of SRSs identified by a parameter $k_{TC}$ called as "transmission Comb" are specified. Each of the communication terminals 2 transmits any one of the two kinds of SRSs in any one of the first uplink communication period for SRS 370a and the second uplink communication period for SRS 370b.

The parameter $k_{TC}$ can assume a value "0" or "1". A plurality of sub-carriers SC0 to be used for transmission of SRS (hereinafter referred to as an "SRS0") specified by the parameter $k_{TC}=0$ is arranged in the frequency direction not in a consecutive manner but in a comb-shaped manner. In other words, a carrier frequency of the SRS0 is arranged in the frequency direction in the comb-shaped manner. Similarly, a plurality of sub-carriers SC1 to be used for transmission of SRS (hereinafter, referred to as an "SRS1") specified by the parameter $k_{TC}=1$ is arranged in the frequency direction in the comb-shaped manner. When the SRS0 and the SRS1 are transmitted in the same frequency bands, the plurality of sub-carriers SC0 to be used for the transmission of the SRS0 and the plurality of sub-carriers SC1 to be used for the transmission of the SRS1 are arranged alternately in the frequency direction. Therefore, the carrier frequency of the SRS0 and the carrier frequency of the SRS1 do not overlap with each other in the frequency direction.

FIG. 7 illustrates transmission of both the SRS0 and SRS1 in a certain frequency band 470. As shown in FIG. 7, the plurality of sub-carriers SC0 to be used for the transmission of the SRS0 is arranged in the frequency direction in every other sub-carrier. Similarly, the plurality of sub-carriers SC1 to be used for the transmission of the SRS1 is arranged in the frequency direction in every other sub-carrier. The plurality of sub-carriers SC0 and the plurality of sub-carriers SC1 included in the same frequency band 470 are arranged alternately in the frequency direction.

Since the plurality of sub-carriers to be used for the transmission of the SRS by one communication terminal 2 is arranged in the frequency direction in the comb-shaped manner, not all the sub-carriers in the SRS transmission band 450 to be used by the communication terminal 2 are used for the transmission of the SRS. Since the plurality of sub-carriers SC0 and the plurality of sub-carriers SC1 included in the same frequency band are arranged are arranged alternately, the communication terminal 2 that transmits the SRS0 and the communication terminal 2 that transmits the SRS1 can use the same SRS transmission band 450 in the same uplink communication period for SRS. When viewed from the side of the base station 1, the base station 1 can discriminate the SRS0 and the SRS1 transmitted in the same SRS transmission band 450 for the same uplink communication period for SRS from each other.

Further, in the communication system 100, eight types of code patterns composed of a plurality of SRS symbols composing the SRS are specified. The eight types of code patterns adopt eight types of code sequences that are orthogonal to each other. The communication terminal 2 transmits any one of the eight types of code patterns as the SRS.

Since the eight types of code patterns that adopt the eight types of code sequences orthogonal to each other are specified in the SRS, at most the eight communication terminals 2 can transmit the SRS0 in the same uplink communication period for SRS using the same SRS transmission band 450. Further, at most the eight communication terminals 2 can transmit the SRS1 in the same uplink communication period for SRS using the same SRS transmission band 450.

In this embodiment, each of the communication terminals 2 transmits the SRS0 in the first uplink communication period for SRS 370a, or transmits the SRS0 in the second uplink communication period for SRS 370b, or transmits the SRS1 in the second uplink communication period for SRS 370b. In the LTE, each of the communication terminals 2 is allowed to transmit the SRS1 in the first uplink communication period for SRS 370a, but in this embodiment, each of the communication terminals 2 does not transmit the SRS1 in the first uplink communication period for SRS 370a.

An uplink radio resource is specified by the first uplink communication period for SRS 370a and the plurality of sub-carriers SC0 of the comb-shape which is included in the frequency band of the special sub-frame 302 and is capable of being used for the transmission of the SRS0. Hereinafter, this uplink radio resource is referred to as a "first uplink radio resource for SRS 500a". Further, an uplink radio resource is specified by the second uplink communication period for SRS 370b and the plurality of sub-carriers SC0 of the comb-shape which is included in the frequency band of the special sub-frame 302 and is capable of being used for the transmission of the SRS0. Hereinafter, this uplink radio resource is referred to as a "second uplink radio resource for SRS 500b". An uplink radio resource is specified by the second uplink communication period for SRS 370b and the plurality of sub-carriers SC1 of the comb-shape which is included in the frequency band of the special sub-frame 302 and is capable of transmitting the SRS1. Hereinafter, this uplink radio resource is referred to as a "third uplink radio resource for SRS 500c".

Figure 8:
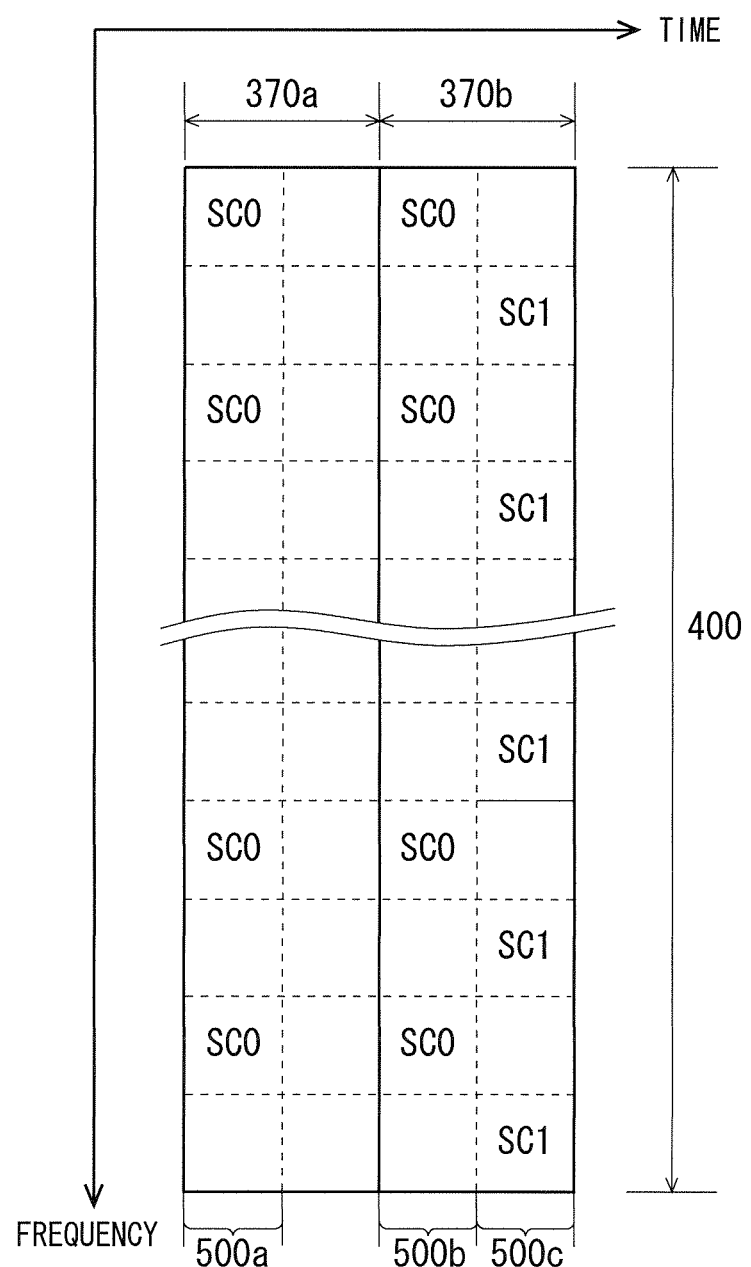
FIG. 8 is a diagram illustrating a plurality of uplink radio resources for SRS.

FIG. 8 is a diagram illustrating the first uplink radio resource for SRS 500a, the second uplink radio resource for SRS 500b and the third uplink radio resource for SRS 500c. As shown in FIG. 8, the first uplink radio resource for SRS 500a, the second uplink radio resource for SRS 500b and the SRS uplink radio resource for SRS 500c are different from each other at least any one of in the time direction and in the frequency direction. These uplink radio resources are, hereinafter, referred to as "uplink radio resources for SRS" unless otherwise discriminated.

In this embodiment, the transmission mode determining section 125 for determining the transmission mode of the SRS determines the uplink communication period for SRS, the SRS transmission bandwidth, a head position of the SRS transmission band 450, the SRS transmission cycle 360, a value of parameter $k_{TC}$ and a type of the SRS code pattern of each of the communication terminals 2 that communicates with the base station 1. As a result, the transmission mode determining section 125 determines any one of the uplink radio resource included in the first uplink radio resource for SRS 500a, the uplink radio resource included in the second uplink radio resource for SRS 500b and the uplink radio resource included in the third uplink radio resource for SRS 500c to be used for the transmission of the SRS in each of the communication terminals 2 to communicate with the base station 1. When the head position of the SRS transmission band 450 changes at every SRS transmission cycle 360, the frequency hopping of the SRS transmission band 450 occurs. For this reason, the transmission mode determining section 125 can determine the SRS transmission bandwidth and the head position of the SRS transmission band 450 in the communication terminal 2 so as to be capable of determining the SRS transmission band 450 of the communication terminal 2. Further, in LTE, a plurality of bandwidths that is different from each other is determined as bandwidths that can be set as the SRS transmission bandwidth. For example, when the system bandwidth is 10 MHz, three types of bandwidths including a bandwidth (180 kHz×40) for 40 resource blocks, a bandwidth (180 kHz×20) for 20 resource blocks, and a bandwidth (180 kHz×4) for 4 resource blocks are determined. The transmission mode determining section 125 determines one of the plurality of bandwidths as the SRS transmission bandwidth.

The transmission signal generating section 120 generates a transmission signal, which is determined by the transmission mode determining section 125 and includes control data (referred to as "SRS control data" hereinafter) for notifying the communication terminal 2 about the transmission mode of the SRS to be transmitted by the communication terminal 2. This transmission signal is transmitted from the communication section 13 to the communication terminal 2 by using the downlink sub-frame 302. As a result, the SRS control data is transmitted to each communication terminal 2. This allows each of the communication terminal 2 to get the transmission mode of the SRS to be transmitted therefrom. That is to say, each of the communication terminals 2 can recognize a type of the code pattern of the SRS to be transmitted therefrom, an uplink radio resource to be used for the transmission of the SRS and the SRS transmission cycle 360. Each of the communication terminals 2 cyclically transmits the SRS based on the transmission mode determined by the base station 1.

It should be noted that the SRS control data includes transmission start data for providing an instruction to start the transmission of the SRS or transmission stop data for providing an instruction to stop the transmission of the SRS. Upon receipt of the SRS control data including the transmission start data, a communication terminal 2 which is not transmitting the SRS starts the cyclic transmission of the SRS based on the transmission mode about which an instruction is provided by the SRS control data. Upon receipt of the SRS control data including the transmission stop data, the communication terminal 2 which is cyclically transmitting the SRS stops the transmission of the SRS. For changing the transmission mode of the SRS to be transmitted by the communication terminal 2, the communication terminal 2 is notified about the SRS control data for providing an instruction about a changed transmission mode. Such SRS control data is referred to as an "RRC Connection Reconfiguration message" in LTE.

<Basic Operation of Communication System in Controlling Transmission of SRS>

Figure 9:
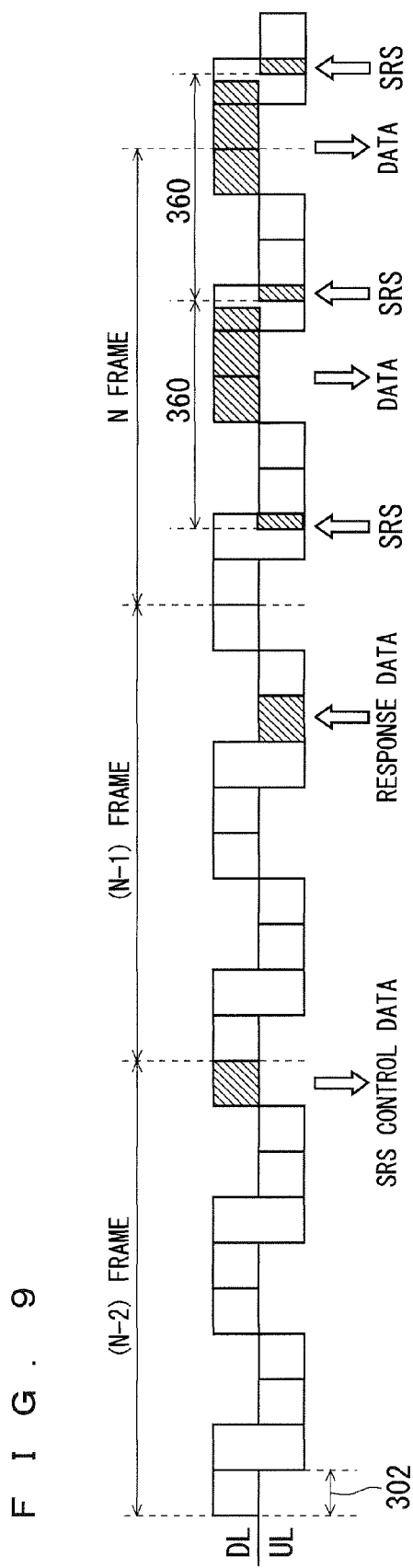
FIG. 9 is a diagram illustrating the operation of the communication system.

Description will be given on the operation of the communication system 100 after a target communication terminal 2 receives the SRS control data and until the target communication terminal 2 transmits the SRS, based on the transmission mode about which notification is provided by the SRS control data. FIG. 9 is a diagram illustrating the operation.

As shown in FIG. 9, after the transmission signal including the SRS control data is transmitted from the base station 1 to a target communication terminal 2 in the downlink sub-frame 302 positioned at the trailing end of the (N−2)th TDD frame 300, the target communication terminal 2 transmits the transmission signal including response data for notifying the base station 1 about normal reception of the SRS control data in the eighth uplink sub-frame 302 (the seventh sub-frame 302) from the leading end of the subsequent (N−1)th TDD frame 300. Such response data is referred to as an "RRC Connection Reconfiguration Complete message".

After transmitting the response data, the target communication terminal 2 transmits the SRS in the transmission mode about which the instruction is provided by the received SRS control data in and after the subsequent N-th TDD frame 300. In the example of FIG. 9, the length of the SRS transmission cycle 360 is set to 5 ms.

In the example of FIG. 9, the target communication terminal 2 transmits the response data in the (N−1)th TDD frame 300, but the target communication terminal 2 transmits the response data in a TDD frame 300 subsequent to the (N−1)th TDD frame 300 in some cases.

When the communication terminal 2 which is transmitting the SRS receives the SRS control data for providing notification about a changed transmission mode, the communication terminal 2 transmits the SRS in the current transmission mode until transmitting the SRS in the changed new transmission mode about which notification is provided by the SRS control data (in the example of FIG. 9, until the second special sub-frame 302 of the (N−1)th TDD frame 300).

In this manner, after the base station 1 transmits the SRS control data to the target communication terminal 2 in a certain TDD frame 300, the target communication terminal 2 transmits the SRS based on the SRS control data in and after a TDD frame 300 which is at least the next but one counting from the certain TDD frame 300. Therefore, when the base station 1 instructs the target communication terminal 2 to start the transmission of the SRS or to change the transmission mode of the SRS, it takes a certain length of time between the transmission of the SRS control data to the target communication terminal 2 and the reception of the SRS transmitted from the target communication terminal 2 based on the SRS control data. The base station 1 transmits the SRS control data to a communication terminal 2 newly connected thereto or a communication terminal 2 that is connected thereto and starts data transmission, and instructs the communication terminals 2 to start transmission of the SRS. As a result, each of the communication terminals 2 which performs downlink communication of data with the base station 1 transmits the SRS to the base station 1.

Also when the base station 1 instructs the communication terminal 2 which is cyclically transmitting the SRS to stop the transmission of the SRS, the communication system 100 similarly operates. For example, after the SRS control data including the transmission stopping data is transmitted from the base station 1 to the target communication terminal 2 in the downlink sub-frame 302 positioned in the trailing end of the (N−2)th TDD frame 300, the target communication terminal 2 transmits response data for notifying the base station 1 about normal reception of the SRS control data to in the eighth uplink sub-frame 302 (seventh sub-frame 302) from the leading end of the subsequent (N−1)th TDD frame 300. After transmitting the response data, the target communication terminal 2 stops the transmission of the SRS in the subsequent Nth TDD frame 300.

In such a manner, when the base station 1 instructs the target communication terminal 2 to stop the transmission of the SRS, it take a certain length of time between the transmission of the SRS control data to the target communication terminal 2 and the stopping of the transmission of the SRS in the target communication terminal 2. The base station 1 transmits the SRS control data to a communication terminal 2 connected to the neighboring base station 1 by handover, and a communication terminal 2 that is connected thereto and completes the data transmission, and instructs the communication terminal 2 to stop the transmission of the SRS. As a result, each of the communication terminals 2 that does not have to perform the downlink communication of data with the base station 1 does not transmit the SRS to the base station 1.

<Association Between the Uplink Radio Resource for SRS and the Downlink Radio Resource>

Figure 10:
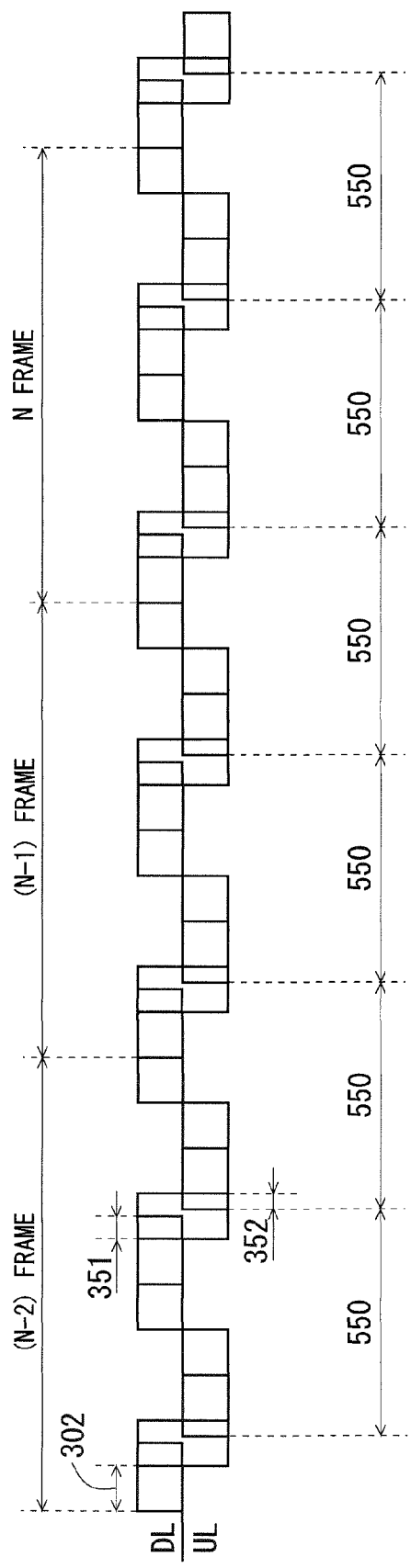
FIG. 10 is a diagram illustrating association unit period.

In this embodiment, as to a period 550 between the leading end of the uplink pilot time slot 352 of the special sub-frame 302 and the leading end of the uplink pilot time slot 352 of the subsequent special sub-frame 302 shown in FIG. 10, the first uplink radio resource for SRS 500*a* and the leading downlink sub-frame 302 included in the period 550 are associated with each other. Further, the second uplink radio resource for SRS 500*b* and the second downlink sub-frame 302 included in the period 550 are associated with each other. The third uplink radio resource for SRS 500*c* included in the period 550 and a portion including the downlink pilot time slot 351 in the special sub-frame 302 included in the period 550 are associated with each other.

Hereinafter, the period 550 is referred to as an "association unit period 550". Further, as to the two downlink sub-frames 302 included in the association unit period 550, a leading one of the downlink sub-frame 302 is referred to as a "first downlink radio resource 560*a*", and a trailing one of the downlink sub-frame 302 is referred to as a "second downlink radio resource 560*b*". Further, a portion including the downlink pilot time slot 351 in the special sub-frame 302 included in the association unit period 550 is referred to as a "third downlink radio resource 560*c*". The first downlink radio resource 560*a*, the second downlink radio resource 560*b* and the third downlink radio resource 560*c* are referred to as the "downlink radio resources 560" unless otherwise discriminated.

Figure 11:
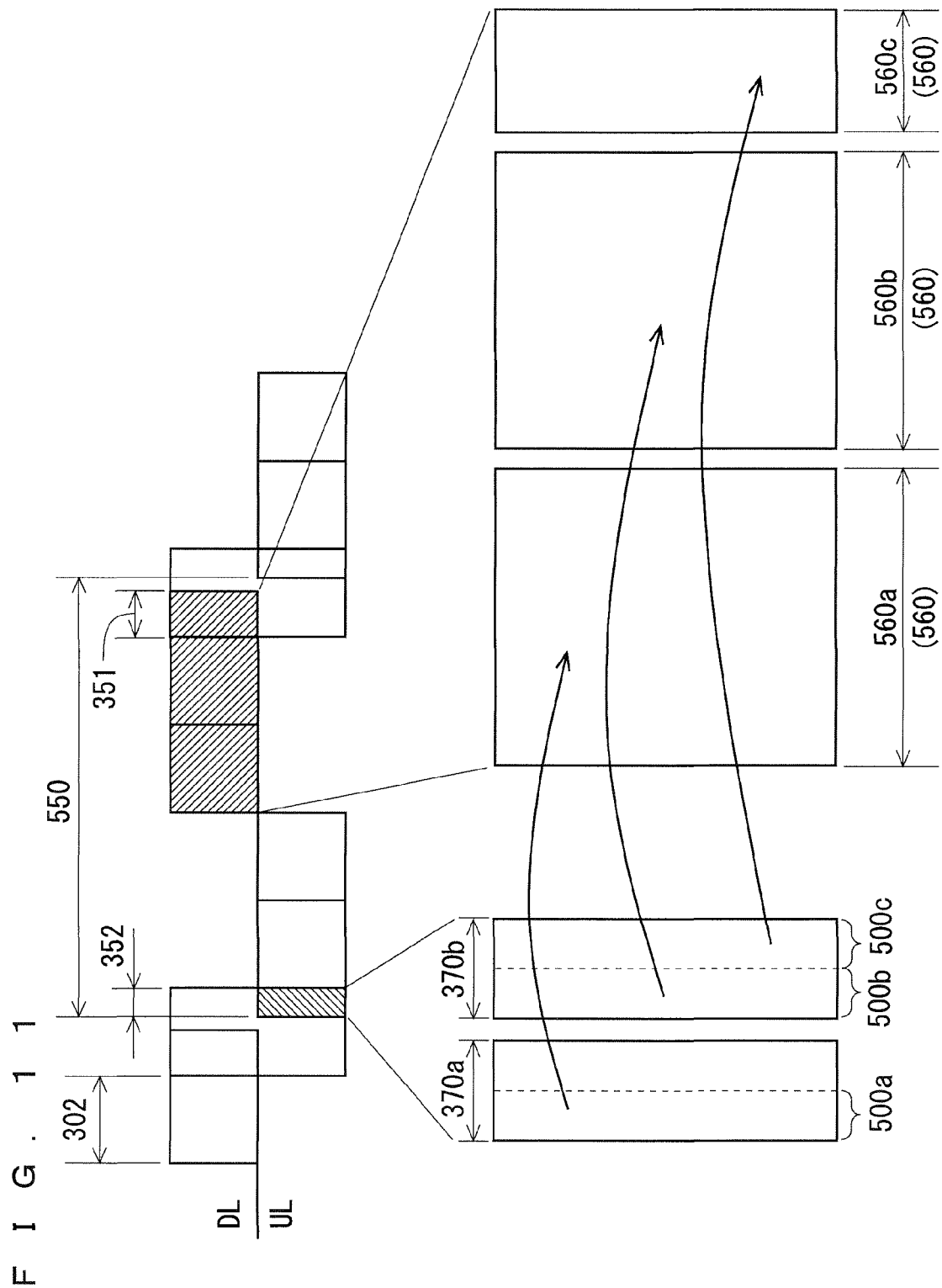
FIG. 11 is a diagram illustrating association between the uplink radio resources for SRS and downlink radio resources.

FIG. 11 is a diagram illustrating the association between the uplink radio resource for SRS and the downlink radio resource 560 in a certain association unit period 550. FIG. 11 illustrates the association unit period 550 including the uplink pilot time slot 352 of the first special sub-frame 302 in the TDD frame 300, but the same is true on the association unit period 550 including the uplink pilot time slot 352 of the second special sub-frame 302 in the TDD frame 300.

When allocating the use downlink radio resource including in the frequency direction a frequency band included in a transmission frequency band (the SRS transmission band 450) of the SRS received by at least a part of the uplink radio resource for SRS to the communication terminal 2 in each of the association unit periods 550, the scheduling executing section 122 allocates the use downlink radio resource from the downlink radio resource 560 associated with the uplink radio resource for SRS to the communication terminal 2. For example, when allocating the use downlink radio resource including in the frequency direction a frequency band included in the transmission frequency band of SRS received by at least a part of the first uplink radio resource for SRS 500*a* to the communication terminal 2, the scheduling executing section 122 allocates the use downlink radio resource from a first downlink radio resource 560*a* associated with the first uplink radio resource for SRS 500*a* to the communication terminal 2. When allocating the use downlink radio resource from downlink radio resource 560 to the communication terminal 2, the scheduling executing section 122 determines, from the communication terminals 2 that transmit the SRS, the communication terminal 2 to which the use downlink radio resource is allocated.

When performing downlink communication with the communication terminal 2 using the use downlink radio resource allocated from the downlink radio resource 560 to the communication terminal 2 in the scheduling executing section 122, the communication section 13 makes the array transmission control based on the SRS received in the frequency band of the use downlink radio resource in the uplink radio resource for SRS associated with the downlink radio resource 560.

Figure 12:
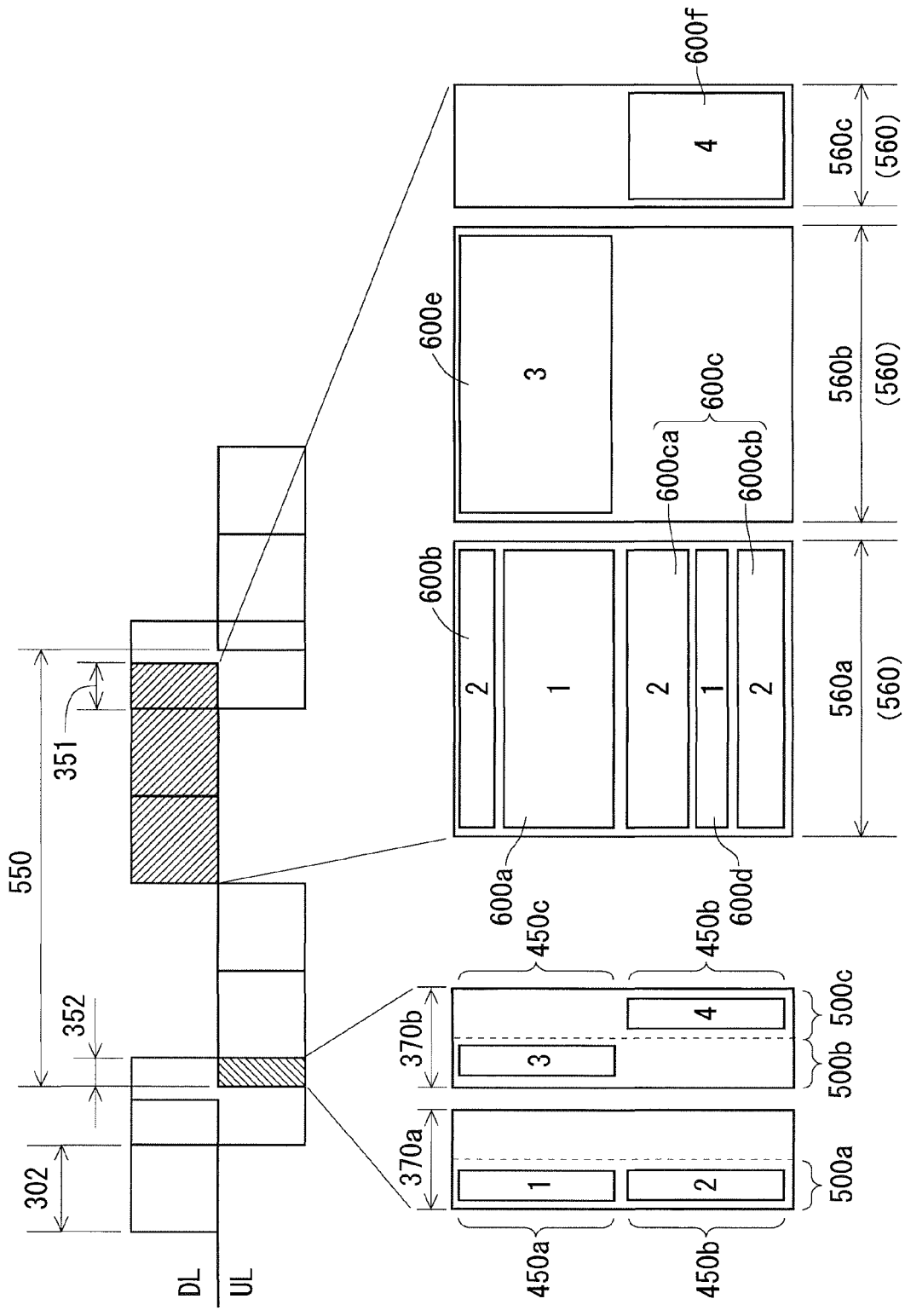
FIG. 12 is a diagram illustrating an example of allocation of the downlink radio resources.

FIG. 12 is a diagram illustrating an allocation example of the use downlink radio resources to the communication terminals 2 of terminal numbers 1 to 4 with which the base station 1 performs downlink communication in a certain association unit period 550. The association unit period 550 being a target of description is hereinafter referred to as a "target association unit period 550".

In an example shown in FIG. 12, each of the communication terminal 2 of terminal numbers 1 and 2 transmits the SRS using a part of the first uplink radio resource for SRS 500*a*. Further, the communication terminal 2 of terminal number 3 transmits the SRS using a part of the second uplink radio resource for SRS 500*b*. The communication terminal 2 of terminal number 4 transmits the SRS using a part of the third uplink radio resource for SRS 500*c*.

As shown in FIG. 12, a use downlink radio resource 600*a* including in the frequency direction a frequency band included in the SRS transmission band 450*a* of the communication terminal 2 of terminal number 1 is allocated from the first downlink radio resource 560*a* to the communication terminal 2 of terminal number 1. Further, a use downlink radio resource 600*b* including in the frequency direction the frequency band included in the SRS transmission band 450*a* is allocated from the first downlink radio resource 560*a* to the communication terminal 2 of terminal number 2.

A use downlink radio resource 600*c* including in the frequency direction the frequency band included in the SRS transmission band 450*b* of the communication terminal 2 of terminal number 2 is allocated from the first downlink radio resource 560*a* to the communication terminal 2 of terminal number 2. The use downlink radio resource 600*c* is composed of two partial downlink radio resources 600*ca* and 600*cb* that are non-contiguous in the frequency direction. Further, a use downlink radio resource 600*d* including in the frequency direction the frequency band included in the SRS transmission band 450*b* is allocated from the first downlink radio resource 560*a* to the communication terminal 2 of terminal number 1.

A use downlink radio resource 600*e* including in the frequency direction the frequency band included in the SRS transmission band 450c of the communication terminal 2 of terminal number 3 is allocated from the second downlink radio resource 560b to the communication terminal 2 of terminal number 3.

A use downlink radio resource 600f including in the frequency direction the frequency band included in the SRS transmission band 450d of the communication terminal 2 of terminal number 4 is allocated from the third downlink radio resource 560c to the communication terminal 2 of terminal number 4.

For downlink communication with the communication terminal 2 of terminal number 1 using the use downlink radio resource 600a included in the first downlink radio resource 560a, the communication section 13 makes the array transmission control based on the SRS from the communication terminal 2 of terminal number 1 received in the frequency band of the use downlink radio resource 600a in the first uplink radio resource for SRS 500a.

When performing the downlink communication with the communication terminal 2 of terminal number 2 using the use downlink radio resource 600b included in the first downlink radio resource 560a, the communication section 13 makes the array transmission control based on the SRS from the communication terminal 2 of terminal number 1 received in the frequency band of the use downlink radio resource 600b in the first uplink radio resource for SRS 500a.

When performing the downlink communication with the communication terminal 2 of terminal number 2 using the use downlink radio resource 600c included in the first downlink radio resource 560a, the communication section 13 makes the array transmission control based on the SRS from the communication terminal 2 of terminal number 2 received in the frequency band of the use downlink radio resource 600c in the first uplink radio resource for SRS 500a.

When performing the downlink communication with the communication terminal 2 of terminal number 1 using the use downlink radio resource 600d included in the first downlink radio resource 560a, the communication section 13 makes the array transmission control based on the SRS from the communication terminal 2 of terminal number 2 received in the frequency band of the use downlink radio resource 600d in the first uplink radio resource for SRS 500a.

When performing the downlink communication with the communication terminal 2 of terminal number 3 using the use downlink radio resource 600e included in the second downlink radio resource 560b, the communication section 13 makes the array transmission control based on the SRS from the communication terminal 2 of terminal number 3 received in the frequency band of the use downlink radio resource 600e in the second uplink radio resource for SRS 500b.

When performing the downlink communication with the communication terminal 2 of terminal number 4 using the use downlink radio resource 600f included in the third downlink radio resource 560c, the communication section 13 makes the array transmission control based on the SRS from the communication terminal 2 of terminal number 4 received in the frequency band of the use downlink radio resource 600f in the third uplink radio resource for SRS 500c.

In this embodiment, the use downlink radio resource, which includes in the frequency direction the frequency band included in the transmission frequency band of the SRS from a certain communication terminal 2 received in the uplink radio resource for SRS, is allocated from the downlink radio resource 560 corresponding to the uplink radio resource for SRS to the communication terminal 2 transmitting the SRS or a communication terminal 2 different form the communication terminal 2 transmitting the SRS.

Hereinafter, like the process for allocating the use downlink radio resources 600a, 600c, 600e and 600f to the communication terminals 2, when the use downlink radio resource, which includes in the frequency direction the frequency band included in the transmission frequency band of the SRS from a communication terminal 2 received in the uplink radio resource for SRS, is allocated from the downlink radio resource 560 corresponding to the uplink radio resource for SRS to the communication terminal 2, the process for allocating the use downlink radio resource to the communication terminal 2 transmitting the SRS is referred to as an "SRS matching downlink allocating process". On the other hand, like the process for allocating the use downlink radio resources 600b and 600d to the communication terminals 2, a process for allocating the use downlink radio resource to a communication terminal 2 other than the communication terminal 2 transmitting the SRS is referred to as an "SRS non-matching downlink allocating process".

<About Array Transmission Control>

In the array transmission control according to this embodiment, null steering and beam forming are simultaneously carried out. In the communication section 13, the reception weight is updated by using a serially updating algorithm such as RLS (Recursive Least-Squares) algorithm at a plurality of times, and a transmission weight is acquired based on the updated reception weight so that both the null steering and the beam forming are carried out simultaneously.

For example, in the example of FIG. 12, when the communication section 13 makes the downlink communication with the communication terminal 2 of terminal number 1 using the use downlink radio resource 600a included in the first downlink radio resource 560a, the reception weight processing section 124 updates a reception weight at a plurality of times based on a plurality of complex symbols composing the SRS from the communication terminal 2 of terminal number 1 received in the frequency band of the use downlink radio resource 600a in the first uplink radio resource for SRS 500a, and the transmission weight processing section 123 acquires a transmission weight based on the updated reception weight. The transmission weight processing section 123 sets the calculated transmission weight to a transmission signal including control data and user data to be transmitted by using the use downlink radio resource 600a.

Further, in the example of FIG. 12, when the communication section 13 performs downlink communication with the communication terminal 2 of terminal number 2 using the use downlink radio resource 600b included in the first downlink radio resource 560a, the reception weight processing section 124 updates a reception weight at a plurality of times based on the plurality of complex symbols composing the SRS from the communication terminal 2 of terminal number 1 which is received in the frequency band of the use downlink radio resource 600b in the first uplink radio resource for SRS 500a, and the transmission weight processing section 123 acquires a transmission weight based on the updated reception weight. The transmission weight processing section 123 sets the calculated transmission weight to a transmission signal to be transmitted by using the use downlink radio resource 600b.

In the array transmission control according to the embodiment, the transmission weight is determined, for example, for each frequency band of one resource block. Hereinafter, the frequency band of one resource block is referred to as an "RB band". For example, in the example of FIG. 12, in a case where the frequency band of the use downlink radio resource 600a allocated to the communication terminal 2 of terminal number 1 is composed of four RB bands, transmission weights are acquired for the four RB bands, respectively, in the array transmission control of the communication terminal 2. The transmission weight to be applied to the signal to be transmitted to the transmission terminal 2 of terminal number 1 by using a certain RB band included in the frequency band of the use downlink radio resource 600*a* is acquired based on a updated reception weight which is obtained by updating the reception weight six times based on six complex symbols received in the certain RB band in the plurality of complex symbols composing the SRS received in the frequency band of the use downlink radio resource 600*a* in the first uplink radio resource for SRS 500*a*. Twelve complex symbols are transmittable using one RB band because 1 resource block includes 12 sub-carriers. On the other hand, as described above, the plurality of sub-carriers used for transmission of SRS by 1 communication terminal 2 is arranged in the frequency direction into the comb-shape. The reception weight processing section 124 updates the reception weight six times using the six complex symbols corresponding to the 6 sub-carries used for the transmission of the SRS by the transmission terminal 2 of terminal number 1 in the 12 complex symbols received in the certain RB band included in the frequency band of the use downlink radio resource 600*a* in the first uplink radio resource for SRS 500*a*.

<Method for Determining MCS>

In the communication system 100 according to this embodiment, M-numbered (M≥2) MCSs in which combination of the modulation system and the coded rate varies are defined. In LTE, 29 the MCSs are defined. Ranks including 0th stage to (M−1)th stage are given to the M-numbered MCSs, respectively. In this embodiment, as the rank rises, an instant transmission throughput of the base station 1 determined by the combination of the modulation system and the coded rate in related MCS is larger. Therefore, when the communication section 13 performs the downlink communication using the MCS of rank (M−1), the instant transmission throughput of the base station 1 becomes maximum. The MCS determining section 126 determines, from the M-numbered MCSs, the MCS to be applied to the transmission signal to be transmitted to the communication terminal 2 by the communication section 13.

Further, in this embodiment, as to the first downlink radio resource 560*a*, the second downlink radio resource 560*b* and the third downlink radio resource 560*c*, one MCS is applied to a transmission signal to be transmitted to one communication terminal 2 by using the downlink radio resource 560 regardless of a size of the frequency band of that transmission signal. That is to say, one MCS is determined for one communication terminal 2 in each of the downlink radio resources 560. For example, in the example of FIG. 12, the MCS determining section 126 determines one MCS to be applied to the transmission signal to be transmitted to the communication terminal 2 of terminal number 1 by using the use downlink radio resources 600*a* and 600*d* included in the first downlink radio resource 560*a*. Further, the MCS determining section 126 determines one MCS to be applied to the transmission signal to be transmitted to the communication terminal 2 of terminal number 2 by using the use downlink radio resource 600*c* included in the first downlink radio resource 560*a*. Hereinafter, the downlink radio resource 560 being a target of the description is referred to as the "target downlink radio resource 560". In LTE, an operation mode, in which the base station 1 determines two or more MCSs for one communication terminal 2 in each of the downlink radio resource 560, is defined, but in this embodiment, as described above, one MCS is determined for one communication terminal 2 in each of the downlink radio resources 560.

The MCS determining section 126 determines one MCS to be applied to the transmission signal to be transmitted to the target communication terminal 2 by using the use downlink radio resource included in the target downlink radio resource 560 based on transmission path characteristics in the downlink direction between the communication section 13 and the target communication terminal 2 in the entire frequency band of the use downlink radio resource. The MCS determining method is described in detail below.

In this embodiment, when receiving a signal from the base station 1, each of the communication terminals 2 acquires an SINR (Signal to Interference plus Noise power Ratio) of the reception signal for each of the RB bands. The SINR for one RB band acquired in the communication terminal 2 represents transmission path characteristics in the downlink direction between the communication terminal 2 and the communication section 13 in one RB band. The communication terminal 2 converts the acquired SINR into CQI (Channel Quality Indicator) information and notifies the base station 1 about the CQI information. The base station 1 can specify the SINR in the communication terminal 2 based on the CQI information from the communication terminal 2.

When determining one MCS to be applied to a transmission signal to be transmitted to the target communication terminal 2 using the use downlink radio resource included in the target downlink radio resource 560, the MCS determining section 126 acquires an average value of past SINRs in the plurality of RB bands included in the frequency band of the use downlink radio resource in the target communication terminal 2. The average value of the SINRs represents the transmission path characteristics in the downlink direction between the target communication terminal 2 and the communication section 13 in the entire frequency band of the use downlink radio resource. The MCS determining section 126 determines one MCS to be applied to the transmission signal to be transmitted to the target communication terminal 2 by using the use downlink radio resource based on the acquired average value of the SINR.

In this embodiment, the MCS determining section 126 stores an association table in which each value of the SINR of the reception signal from the base station 1 in the communication terminal 2 and the MCS to be applied to the transmission signal to the communication terminal 2 at a time when the SINR in the communication terminal 2 is a relevant value are associated with each other and are registered. The association table is prepared for each of the communication terminal 2. The MCS determining section 126 refers to the association table of the target communication terminal 2 so as to specify the MCS corresponding to the acquired average value of the SINRs, and determines the MCS as the MCS to be applied to the transmission signal to the target communication terminal 2.

In such a manner, the MCS is determined according to the transmission path characteristics in the downlink direction between the communication section 13 and the target communication terminal 2 in the entire frequency band of the use downlink radio resource.

It is difficult to accurately represent the transmission path characteristics in the downlink direction between the base station 1 and the target communication terminal 2 only by the SINR acquired by the target communication terminal 2. For this reason, the optimum rank of the MCS to be applied to the transmission signal to the target communication terminal 2 occasionally changes even when the value of the SINR in the target communication terminal 2 does not change.

The MCS determining section 126 therefore updates the association table of each of the communication terminal 2 based on a result of the downlink communication between the base station 1 and the communication terminal 2. The method for updating the association table is described below.

In this embodiment, for each of the downlink radio resources 560, each of the communication terminal 2 notifies the base station 1 about ACK/NACK information representing whether data included in the transmission signal to be transmitted by the base station 1 by using each of the downlink radio resource 560 is suitably received. The MCS determining section 126 observes the ACK/NACK information from the target communication terminal 2 during the plurality of the TDD frames 300, and calculates a reception error rate in the target communication terminal 2. When the reception error rate in the target communication terminal 2 is large or small, the MCS determining section 126 updates the association table of the target communication terminal 2. On the other hand, when the reception error rate in the target communication terminal 2 is suitable, the MCS determining section 126 does not update but maintains the association table.

When the reception error rate in the target communication terminal 2 is large or small, the MCS determining section 126 changes each value of the SINRs in the association table of the target communication terminal 2 or changes the MCS associated with each value of the SINRs. For example, when the reception error rate in the target communication terminal 2 is large, namely, the reception error rate is larger than a first threshold, the MCS determining section 126 increases each value of the SINRs registered in the association table of the target communication terminal 2 by a predetermined value or downgrades the MCS associated with each value by one. Further, when the reception error rate in the target communication terminal 2 is small, namely, when the reception error rate is smaller than a second threshold (< the first threshold), the MCS determining section 126 decreases each value of the SINRs registered in the association table of the target communication terminal 2 by a predetermined value or upgrades each of the MCSs associated with each value by one.

In such a manner, the association table, which is used for determining the MCS to be applied to the transmission signal to the communication terminal 2 from the SINR in the communication terminal 2, is updated based on the result of the downlink communication between the base station 1 and the communication terminal 2, so that a suitable MCS can be applied to the transmission signal to the communication terminal 2.

<Details of Downlink Scheduling>

When the base station 1 executes the SRS matching downlink allocating process so as to perform the downlink communication with the target communication terminal 2 to which the use downlink radio resource is allocated, the communication section 13 can suitably direct a beam relating to transmission directivity of the array antenna 110 at the target communication terminal 2. Further, when the base station 1 executes the SRS matching downlink allocating process so as to perform the downlink communication with the target communication terminal 2 to which the use downlink radio resource is allocated, the neighboring base station 1 can suitably direct null relating to the transmission directivity of the array antenna 110 at the communication terminal 2 to which the same downlink radio resource as the use downlink radio resource is allocated as the use downlink radio resource by means of the SRS matching downlink allocating process. This point is described in detail below.

FIGS. 13 and 14 are diagrams for describing that the SRS matching downlink allocating process is executed to suitably control the beam and the null relating to the transmission directivity of the array antenna 110. FIG. 13 illustrates an allocation example of the use downlink radio resources in two base stations 1a and 1b in the target association unit period 550. Further, FIG. 14 illustrates the beam and null relating to transmission directivity of the base stations 1a and 1b in the target association unit period 550.

In the examples of FIGS. 13 and 14, in the target association unit period 550, the base station 1a executes the SRS matching downlink allocating process so as to allocate a use downlink radio resource 610a to the communication terminal 2 of terminal number 1. Further, the base station 1b executes the SRS matching downlink allocating process so as to allocate a use downlink radio resource 610b to the communication terminal 2 of terminal number 5. Further, in the examples of FIGS. 13 and 14, both the communication terminal 2 of terminal number 1 and the communication terminal 2 of terminal number 5 transmit the SRS using the first uplink radio resource for SRS 500a. Further, in the examples of FIGS. 13 and 14, the SRS transmission band 450a of the communication terminal 2 of terminal number 1 matches with the SRS transmission band 450e of the communication terminal 2 of terminal number 5.

In the examples of FIGS. 13 and 14, since the uplink radio resource to be used for transmission of the SRS by the communication terminal 2 of terminal number 1 matches with the uplink radio resource to be used for transmission of the SRS by the communication terminal 2 of terminal number 5, the SRS received by the base station 1a from the communication terminal 2 of terminal number 1 in the first uplink radio resource for SRS 500a includes the SRS to be transmitted by the communication terminal 2 of terminal number 5 communicating with the base station 1b around the base station 1a as an interference component. Therefore, when the base station 1a calculates the transmission weight based on the SRS received from the communication terminal 2 of terminal number 1 in the first uplink radio resource for SRS 500a and sets the transmission weight to the transmission signal to be transmitted to the communication terminal 2 of terminal number 1 using the use downlink radio resource 610a, as shown in FIG. 14, in the transmission directivity of the array antenna 110 at the transmission by the base station 1a using the use downlink radio resource 610a, a beam 700a directs at the communication terminal 2 of terminal number 1 and a null 701a directs at the communication terminal 2 of terminal number 5 that communicates with the base station 1b. The base station 1a therefore can securely send a transmission signal to the communication terminal 2 being a target of communication, and can repress the interference to the communication terminal 2 with which the neighboring base station 1b communicates. Considering from the side of the base station 1b, when the neighboring base station 1a communicates with the communication terminal 2, the base station 1a directs a null toward the communication terminal 2 communicating with the base station 1b.

On the other hand, the SRS, which is received by the base station 1b from the communication terminal 2 of terminal number 5 in the first uplink radio resource for SRS 500a, includes the SRS to be transmitted by the communication terminal 2 of terminal number 1 communicating with the base station 1a around the base station 1b as the interference component. Therefore, when the base station 1b calculates a transmission weight based on the SRS received from the communication terminal 2 of terminal number 5 in the first uplink radio resource for SRS 500a and sets the transmission weight to a transmission signal to be transmitted to the communication terminal 2 of terminal number 5 using the matching downlink radio resource 610b, as shown in FIG. 14, in the transmission directivity of the array antenna 110 at a time when the base station 1*b* transmits the transmission signal using the use downlink radio resource 610*b*, a beam 700*b* directs at the communication terminal 2 of terminal number 5, and a null 701*b* directs at the communication terminal 2 of terminal number 1 communicating with the base station 1*a*. Therefore, the base station 1*b* can securely send a transmission signal to the communication terminal 2 being a target of the communication, and can repress the interference to the communication terminal 2 communicating with the neighboring base station 1*a*.

In such a manner, when the SRS matching downlink allocating process is executed, a beam can be directed at the communication terminal 2 being a target of communication, and a null can be directed at the communication terminal 2 being a non-target of communication. For this reason, the beam and the null can be suitably controlled.

However, when the SRS matching downlink allocating process is executed and the use downlink radio resource is allocated to the target communication terminal 2 without taking the transmission path characteristics (radio characteristics) in the downlink direction between the target communication terminal 2 and the communication section 13 in the frequency band of an allocation destination of the use downlink radio resource into consideration, the use downlink radio resource including in the frequency direction the frequency band whose transmission path characteristics is bad is likely to be allocated to the target communication terminal 2. As a result, a possibility that the transmission signal from the base station 1 does not suitably reach the target communication terminal 2 is high, and transmission performance of the base station 1 with respect to the target communication terminal 2 is deteriorated. Further, the MCS to be applied to the transmission signal to be transmitted to the target communication terminal 2 by using the use downlink radio resource is determined based on the transmission path characteristics in the downlink direction between the target communication terminal 2 and the communication section 13 in the entire frequency band of the use downlink radio resource. For this reason, when the transmission path characteristics are not satisfactory, the MCS to be applied to the transmission signal is downgraded. Therefore, the use downlink radio resource, which includes the frequency band whose transmission path characteristics in the downlink direction between the target communication terminal 2 and the communication section 13 are not satisfactory, is allocated to the target communication terminal 2, the transmission throughput of the communication section 13 with respect to the target communication terminal 2 is deteriorated, and the transmission performance of the base station 1 with respect to the target communication terminal 2 is deteriorated.

Figure 15:
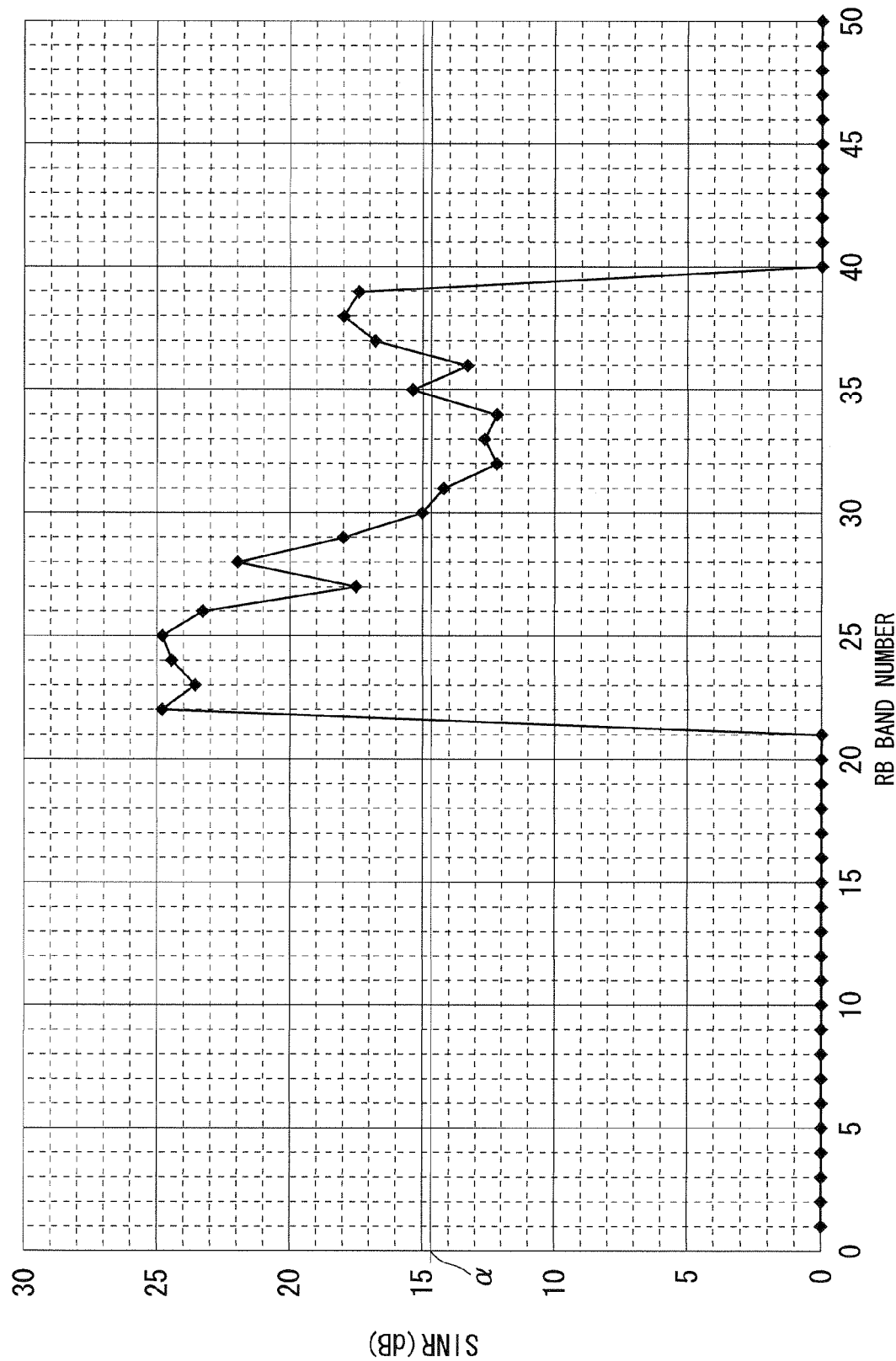
FIG. 15 is a diagram illustrating transmission path characteristics between the base station and a communication terminal.

Further, when the frequency band of the use downlink radio resource to be allocated to the target communication terminal 2 is composed of the plurality of RB bands and the frequency band is large, the transmission path characteristics in the downlink direction between the target communication terminal 2 and the communication section 13 occasionally disperse in the frequency band due to frequency selective fading. FIG. 15 shows such a state.

FIG. 15 illustrates one example of the transmission path characteristics in the downlink direction between the target communication terminal 2 and the communication section 13 at time when the communication section 13 performs the downlink communication with the target communication terminal 2 using the use downlink radio resource including RB bands of numbers 22 to 38 in the frequency direction. In FIG. 15, an abscissa axis represents the RB band numbers, and an ordinate axis represents the SINR of a reception signal received by the target communication terminal 2 in the RB bands specified by the RB band numbers. In this embodiment, the system band is composed of, for example, 50 RB bands, and RB band numbers 1 to 50 are allocated to the 50 RB bands in increasing order of the frequency.

As shown in FIG. 15, since the SINR of the reception signal received by the target communication terminal 2 in the 8 RB bands of RB band numbers 22 to 29 increases, the transmission path characteristics in the frequency band composed of the 8 RB bands of RB band numbers 22 to 29 are satisfactory.

On the other hand, since the SINR of the reception signal received by the target communication terminal 2 in the 7 RB bands of RB band numbers 30 to 36 is small, the transmission path characteristics in the frequency band composed of the 7 RB bands of RB band numbers 30 to 36 are unsatisfactory.

In such a manner, even when the frequency band of the use downlink radio resource allocated to the target communication terminal 2 includes a frequency band whose transmission path characteristics are satisfactory, in the case where a frequency band whose transmission path characteristics are unsatisfactory is included, the transmission path characteristics are deteriorated in view of the entire frequency band of the use downlink radio resource, and an average value of the SINRs in the 18 RB bands included in the frequency band of the use downlink radio resource is small. Therefore, the MCS that is downgraded is applied as the MCS to be applied to the transmission signal to be transmitted by the use downlink radio resource. As a result, frequency usage efficiency in the downlink communication with the target communication terminal 2 to be performed by the communication section 13 is lowered, the transmission throughput of the communication section 13 with respect to the target communication terminal 2 is lowered, and the transmission performance of the base station 1 is deteriorated.

On the contrary, in the case where the use downlink radio resource is allocated to the communication terminal 2 with not the array transmission control but only the transmission path characteristics in the downlink direction being taken into consideration, like the SRS non-matching downlink allocating process, when the use downlink radio resource including in the frequency direction the frequency band included in the transmission frequency band of the SRS received in the uplink radio resource for SRS 500*a* is allocated to the communication terminal 2, the use downlink radio resource is likely to be allocated to the communication terminal 2 other than the communication terminal 2 transmitting the SRS. In this case, when the communication section 13 performs downlink communication with the target communication terminal 2 using the use downlink radio resource, the array transmission control is made based on not the SRS from the target communication terminal 2 but the SRS from the communication terminal 2 different from the target communication terminal 2, so that the array transmission control cannot be suitably made. FIG. 16 is a diagram for describing that status.

FIG. 16 illustrates an allocation example of the use downlink radio resource in the two base stations 1*a* and 1*b* in the target association unit period 550. In the example of FIG. 16, the base station 1*a* executes the SRS non-matching downlink allocating process in the target association unit period 550, and allocates a use downlink radio resource 620*a*, which includes in the frequency direction the frequency band included in transmission frequency band (the SRS transmission band 450*a*) of the SRS to be transmitted by the communication terminal 2 of terminal number 1, to the communication terminal 2 of terminal number 2. Further, the base station 1*b* executes the SRS non-matching downlink allocating process so as to allocate a use downlink radio resource 620*b*, which includes in the frequency direction the frequency band included in the transmission frequency band (the SRS transmission band 450*e*) of the SRS to be transmitted by the communication terminal 2 of terminal number 5, to the communication terminal 2 of terminal number 6. Further, in the example of FIG. 16, both the communication terminal 2 of terminal number 1 that communicates with the base station 1*a* and the communication terminal 2 of terminal number 5 that communicates with the neighboring base station 1*b* transmit the SRS using the first uplink radio resource for SRS 500*a*. Further, in the example of FIG. 16, the SRS transmission band 450*a* of the communication terminal 2 of terminal number 1 matches with the SRS transmission band 450*e* of the communication terminal 2 of terminal number 5.

In the example of FIG. 16, since the uplink radio resource to be used for transmitting the SRS by the communication terminal 2 of terminal number 1 matches with the uplink radio resource to be used for transmitting the SRS by the communication terminal 2 of terminal number 5, the SRS, which is received by the base station 1*a* from the communication terminal 2 of terminal number 1 in the first uplink radio resource for SRS 500*a*, includes the SRS to be transmitted by the communication terminal 2 of terminal number 5 with which the base station 1*b* around the base station 1*a* communicates as the interference component. In such a case, when the base station 1*a* calculates a transmission weight based on the SRS received from the communication terminal 2 of terminal number 1 in the first uplink radio resource for SRS 500*a* and sets the transmission weight to a transmission signal to be transmitted to the communication terminal 2 of terminal number 2 using the use downlink radio resource 620*a*, a beam relating to the transmission directivity of the array antenna 110 at the transmission by the base station 1*a* using the use downlink radio resource 620*a* is directed at the communication terminal 2 of terminal number 1, but is not always directed at the communication terminal 2 of terminal number 2 being a target of communication. That is to say, in such a case, the beam relating to transmission directivity of the array antenna 110 cannot be intentionally directed at the communication terminal 2 of terminal number 2. Therefore, the base station 1*a* is not likely to send the transmission signal to the communication terminal 2 of terminal number 2 being a target of communication, and thus the transmission performance of the base station 1*a* is deteriorated.

Further, the null relating to the transmission directivity at the array antenna 110 at the transmission by the base station 1*a* using the use downlink radio resource 620*a* directs at the communication terminal 2 of terminal number 5 communicating with the base station 1*b* around the base station 1*a*, but does not always direct at the communication terminal 2 of terminal number 6 in which the same use downlink radio resource as that in the communication terminal 2 of terminal number 2 is used. That is to say, in such a case, the null relating to the transmission directivity of the array antenna 110 cannot intentionally direct at the communication terminal 2 of terminal number 6 where interference is desired to be suppressed. Therefore, the base station 1*a* is likely to interfere with the communication terminal 2 of terminal number 6. That is to say, when receiving a signal from the base station 1*b*, the communication terminal 2 of terminal number 6 is likely to receive a signal transmitted by the base station 1*a* to the communication terminal 2 of terminal number 2 as an interference wave.

Similarly, in the base station 1*b*, the possibility that the beam directs at the communication terminal 2 of terminal number 6 being a target of communication is decreased, and the possibility that the null directs at the communication terminal 2 of terminal number 2 where the interference is desired to be repressed is decreased. In the base station 1*b*, therefore, the possibility that the transmission signal cannot be sent to the communication terminal 2 of terminal number 6 being a target of communication is increased, and the possibility that the interference with the communication terminal 2 of terminal number 2 is increased.

In such a manner, when the base station 1*a* and the neighboring base station 1*b* execute the SRS non-matching downlink allocating process so as to allocate the same use downlink radio resources to the communication terminal 2, the possibility that the beam directs at the communication terminal 2 being a target of communication is decreased and the possibility that the null directs at the communication terminal 2 being a non-target of communication is decreased in the base stations 1*a* and 1*b*. As a result, since the array transmission control cannot be suitably made respectively in the base stations 1*a* and 1*b*, the transmission performance of the base stations 1*a* and 1*b* is deteriorated.

In the case where, as shown in FIG. 17, the SRS non-matching downlink allocating process is executed and the use downlink radio resource 620*a* is allocated to the communication terminal 2 of terminal number 2 in the base station 1*a* and where, like in the example of FIG. 13, the SRS matching downlink allocating process is executed and the use downlink radio resource 610*b* that is the same as the use downlink radio resource 620*a* is allocated to the communication terminal 2 of terminal number 5 in the base station 1*b*, the base station 1*a* can direct the null at the communication terminal 2 of terminal number 5, but the base station 1*b* cannot direct the null at the communication terminal 2 of terminal number 2.

As described above, when the base station 1 allocates the use downlink radio resource to the communication terminal 2 with only the transmission path characteristics in the downlink direction being taken into consideration, the transmission signal from the base station 1 is likely not to be sent to the communication terminal 2, and the base station 1 is likely to interfere with the communication terminal 2 that communicates with the neighboring base station 1. Therefore, the transmission performance of the base station 1 is deteriorated.

In this embodiment, therefore, downlink scheduling that can improve the transmission performance of the base station 1 is proposed. The downlink scheduling in the base station 1 is described in detail below.

Figure 18:
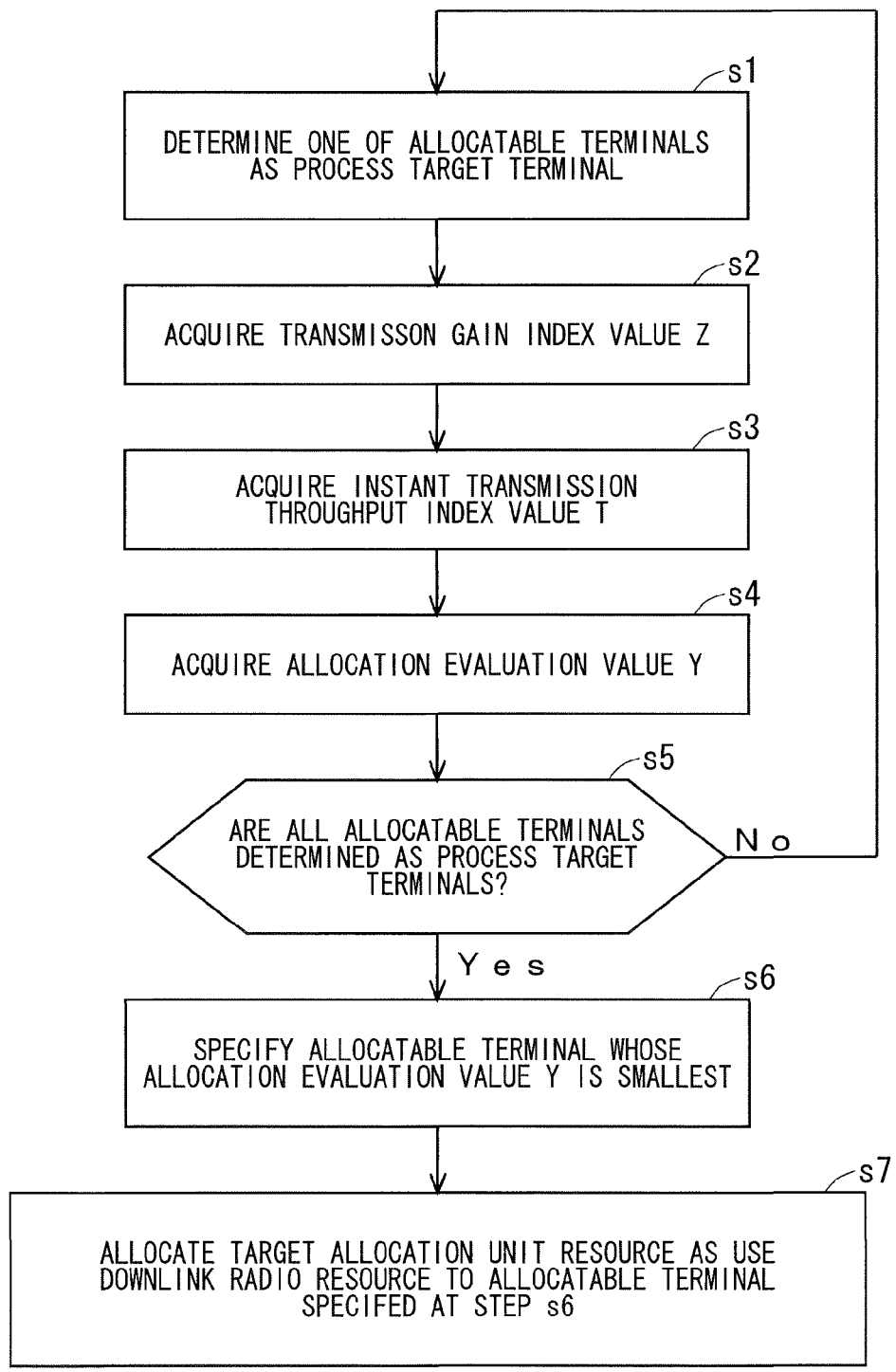
FIG. 18 is a flowchart illustrating a unit resource allocating process in the base station.

FIG. 18 is a flowchart illustrating the downlink scheduling in the base station 1. The downlink scheduling according to this embodiment is carried out for each of the downlink radio resources 560. Further, in the downlink scheduling according to this embodiment, a portion in the downlink radio resource 560, which includes in the frequency direction one RB band included in the transmission frequency band of the SRS to be received in the uplink radio resource for SRS corresponding to the downlink radio resource 560 is an allocation unit of the downlink radio resource. This allocation unit is referred to as an "allocation unit resource 700". The communication terminal 2 to which the use downlink radio resource is allocated is determined for each of the allocation unit resources 700. That is to say, a unit resource allocating process is executed so as to determine the communication terminal 2 to which the allocation unit resources 700 is allocated as the use downlink radio resource according to each of the allocation unit resources 700.

Figure 19:
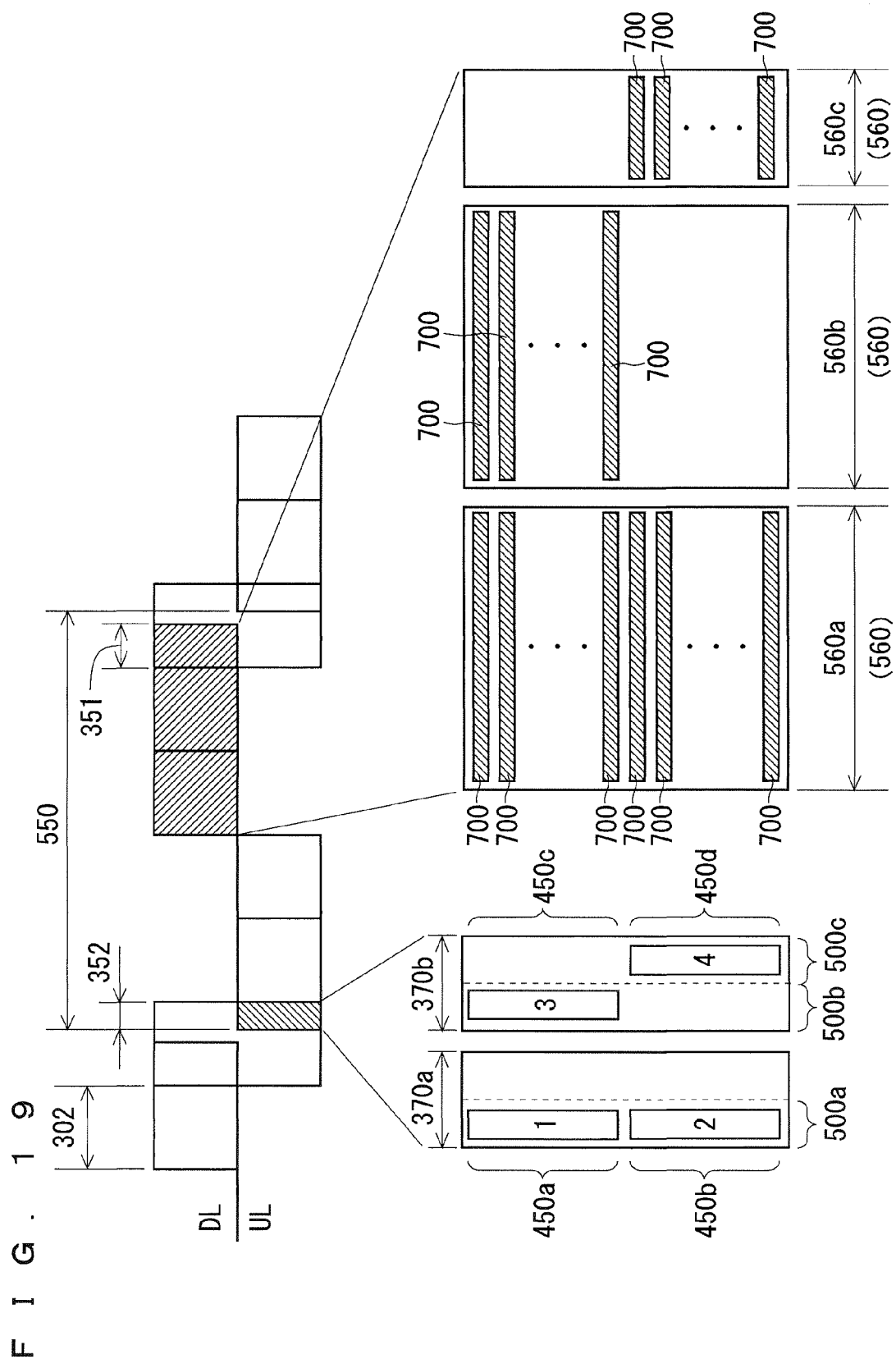
FIG. 19 is a diagram for describing an allocation unit resource.

FIG. 19 is a diagram illustrating the allocation unit resource 700 in a case where, as shown in FIG. 12, the SRS is transmitted in the uplink radio resource for SRS. As shown in FIG. 19, the first downlink radio resource 560*a* includes the plurality of the allocation unit resources 700 including in the frequency direction the plurality of RB bands included in the SRS transmission band 450a, and the plurality of allocation unit resources 700 including in the frequency direction the plurality of RB bands included in the SRS transmission band 450b. Further, the second downlink radio resource 560b includes the plurality of allocation unit resources 700 including in the frequency direction the plurality of RB bands included in the SRS transmission band 450c. The third downlink radio resource 560c indicates the plurality of allocation unit resources 700 including in the frequency direction the plurality of RB bands included in the SRS transmission band 450d.

FIG. 18 is a flowchart illustrating the unit resource allocating process of a certain allocation unit resource 700. The scheduling executing section 122 executes a series of processes shown in FIG. 18, for each of the downlink radio resources 560, on each of the allocation unit resources 700 included in each of the downlink radio resources 560.

Figure 20:
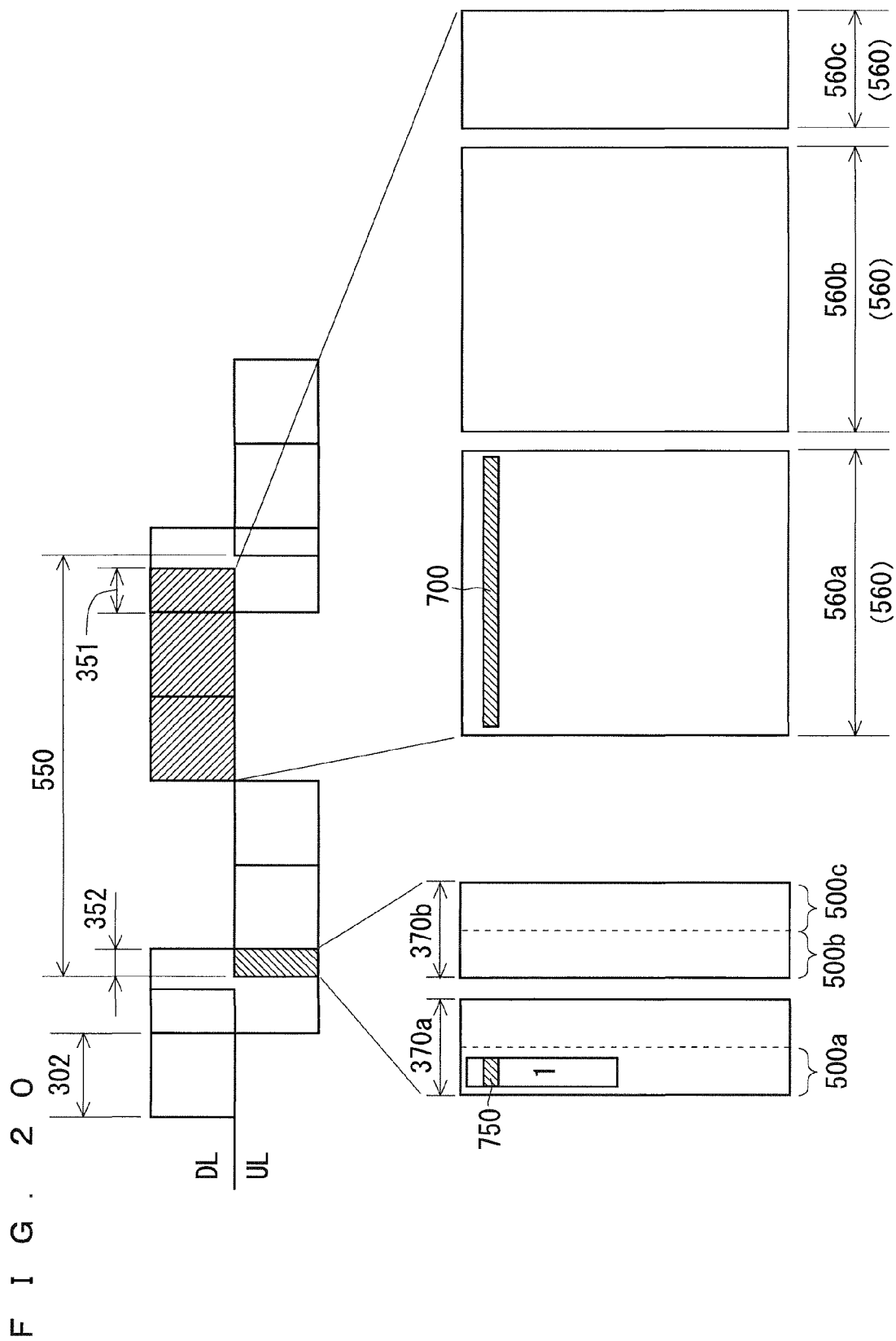
FIG. 20 is a diagram illustrating a relationship between the allocation unit resource and a use SRS.

The allocation unit resource 700 to be described is, hereinafter, referred to as a "target allocation unit resource 700". Further, in the uplink radio resource for SRS corresponding to the downlink radio resource 560 to which the target allocation unit resource 700 belongs, the SRS received in one RB band included in the target allocation unit resource 700 is referred to as a "use SRS", and the communication terminal 2 transmitting the SRS is referred to as a "use SRS transmission terminal 2". Therefore, the SRS to be used in the array transmission control at time when the communication section 13 performs the downlink communication using the target allocation unit resource 700 is the use SRS, and the communication terminal 2 transmitting the SRS is the use SRS transmission terminal 2. FIG. 20 is a diagram illustrating the target allocation unit resource 700 included in the first downlink radio resource 560a, and the use SRS 750 corresponding thereto. In the example of FIG. 20, the use SRS transmission terminal 2 transmitting the use SRS 750 is the communication terminal 2 of terminal number 1.

In this embodiment, when the communication terminal 2 to which the target allocation unit resource 700 is allocated as the use downlink radio resource is determined, the communication terminal 2, which transmits the SRS in the uplink radio resource for SRS corresponding to the downlink radio resource 560 including the target allocation unit resource 700, is determined as the communication terminal 2 to which the target allocation unit resource 700 can be allocated. For example, in the example of FIG. 19, the communication terminal 2 to which the target allocation unit resource 700 included in the first downlink radio resource 560a can be allocated is the communication terminal 2 of terminal number 1 and the communication terminal 2 of terminal number 2 that transmit the SRS in the first uplink radio resource for SRS 500a corresponding to the first downlink radio resource 560a. Further, the communication terminal 2 to which the target allocation unit resource 700 included in the second downlink radio resource 560b can be allocated is only the communication terminal 2 of terminal number 3 that transmits the SRS in the second uplink radio resource for SRS 500b. Further, the communication terminal 2 to which the target allocation unit resource 700 included in the third downlink radio resource 560c can be allocated is only the communication terminal 2 of terminal number 4 that transmits the SRS in the third uplink radio resource for SRS 500c. Hereinafter, the communication terminal 2 to which the target allocation unit resource 700 can be allocated as the use downlink radio resource is referred to as an "allocatable terminal 2". Hereinafter, the unit resource allocating process of the target allocation unit resource 700 is described below with reference to FIG. 18.

As shown in FIG. 18, the scheduling executing section 122 determines one of the allocatable terminals 2 as a process target terminal 2 at step s1.

At step s2, the scheduling executing section 122 acquires an index value Z (hereinafter, referred to as a "transmission gain index value Z") representing a predicted value of a transmission gain with respect to the process target terminal 2 at time when the communication section 13 makes the array transmission control based on the use SRS to perform the downlink communication with the process target terminal 2 using the target allocation unit resource 700. The transmission gain index value Z is acquired according to the following formula (1).

[Mathematical Formula 1]

$$Z = W \times h \quad (1)$$

W represents a transmission weight vector to be acquired by the communication section 13 based on the use SRS. The transmission weight vector W is composed of the plurality of transmission weights to be set to the plurality of transmission signals to be transmitted from the plurality of antennas 110a, respectively. Further, h represents an array response vector of a signal (desired wave component) from the process target terminal 2. The transmission gain index value Z is a scalar value, or referred to as an array response value. The array response vector h is acquired by the communication section 13. A method for obtaining the array response vector h is described below.

A reception signal vector X, which is composed of a reception signal for 1 sub-carrier including the SRS to be transmitted by the process target terminal 2 as a desired wave component and is received by the plurality of antennas 110a, is expressed by the following formula (2).

[Mathematical Formula 2]

$$X = h \times S + h1 \times U1 + h2 \times U2 + \ldots + hL \times UL + N \quad (2)$$

S represents a signal vector of a desired wave component composed of the SRS (SRS symbol) for 1 sub-carrier to be transmitted by the process target terminal 2 which is received by the plurality of antennas 110a. Ul (1≤l≤L) represents a signal vector of the interference wave component composed of the SRS (SRS symbol) for 1 sub-carrier to be transmitted by the communication terminal 2 communicating with the neighboring base station 1 which is received by the plurality of antennas 110a. Further, N represents a signal vector of the internal noise component. Further, h1 represents the array response vector of the interference component.

The reception weight processing section 124 of the communication section 13 acquires a correlation value between the reception signal vector X per sub-carrier and the signal vector S of the desired wave component acquired from an output signal from the radio processing section 11. The reception weight processing section 124 acquires the correlation value for each of 6 sub-carriers to be used for the transmission of SRS included in one RB band. The reception weight processing section 124 calculates an average value of the acquired six correlation values. This average value is referred to as a "correlation average value".

Since frequencies of 12 sub-carriers included in one RB band are adjacent to each other, the array response vectors h in the reception signal vectors X of the 6 sub-carriers to be used for the transmission of SRS by one communication terminal 2 in 12 sub-carriers are considered to be the same as each other. The same is true on the array response vector h1. Further, the correlation value between the SRS to be transmitted by the communication terminal 2 communicating with the base station 1 and the SRS to be transmitted by the communication terminal 2 communicating with the neighboring base station 1 is averaged to be reduced. Further, a correlation between the signal vector N of the internal noise component and the signal vector S of the desired wave component is also low. The correlation value between the signal vector S of the desired wave component and the signal vector S of the desired wave component is such that all the vector elements are "1". Therefore, the correlation average value is roughly equal to the array response vector h. In such a manner, the reception weight processing section 124 acquires the array response vector h of one RB band.

In the above example, the array response vector h (the correlation average value) is acquired for each RB band, but the array response vector h (the correlation average value) may be acquired for every two or more RB bands.

The reception weight processing section 124 acquires, for each of the communication terminals 2 transmitting the SRS, the array response vector h of all the RB bands included in all the frequency bands where each of the communication terminals 2 transmits the SRS, namely, frequency bands where the SRS transmission band 450 of each of the communication terminals 2 performs frequency hopping for one cycle.

Further, every time when the communication terminal 2 transmits the SRS in the SRS transmission cycle 360, the reception weight processing section 124 acquires the array response vector h of the communication terminal 2. The reception weight processing section 124 acquires the array response vector h of each of the RB bands included in the frequency band (the SRS transmission bands 450 of the SRS) of a reception signal based on the reception signal which is received by the communication section 13 in the uplink radio resource for SRS used by the communication terminal 2 for the transmission of the SRS and includes the SRS as a desired wave component. When the array response vector h of the same RB band is already present as the newly acquired array response vector h, the reception weight processing section 124 stores the newly acquired array response vector h instead of the old array response vector h. In such a manner, a new array response vector h is always stored in the communication section 13.

The scheduling executing section 122 acquires the array response vector h of the process target terminal 2 in the RB band included in the target allocation unit resource 700 from the reception weight processing section 124, and acquires the transmission gain index value Z of the process target terminal 2 according to the above formula (1).

At step s3, the scheduling executing section 122 acquires an index value T (hereinafter, referred to as an "instant transmission throughput index value T") representing a predicted value of the transmission throughput of the communication section 13 at time when the communication section 13 performs the downlink communication with the process target terminal 2 using the target allocation unit resource 700. In this embodiment, the process target terminal 2 acquires an average value of past SINRs in the process target terminal 2 in the plurality of RB bands included in a transmission frequency band (hereinafter, referred to as the "SRS transmission band 450 of the process target terminal 2") of the SRS to be transmitted in the uplink radio resource for SRS corresponding to the downlink radio resource 560 including the target allocation unit resource 700. The scheduling executing section 122 adjusts the acquired average value of the SINRs based on the reception error rate of the process target terminal 2 acquired from a result (ACK/NACK information from the process target terminal 2) of past downlink communication between the base station 1 and the process target terminal 2. Concretely, when the reception error rate of the process target terminal 2 is larger than the first threshold, the scheduling executing section 122 reduces the average value of the SINRs by a predetermined value. When the reception error rate of the process target terminal 2 is smaller than the second threshold (< the first threshold), the scheduling executing section 122 increases the average value of the SINRs by a predetermined value. The scheduling executing section 122 adopts the average value of the SINRs adjusted in such a manner as the instant transmission throughput index value T. When the reception error rate of the process target terminal 2 is suitable (equal to or less than the first threshold and equal to or more than the second threshold), the average value of the SINRs becomes directly the instant transmission throughput index value T.

As is understood from the following description, the target allocation unit resource 700 is likely to be allocated to the use SRS transmission terminal 2. Therefore, the use downlink radio resource, which is allocated to the target communication terminal 2 transmitting the SRS in the uplink radio resource for SRS corresponding to the downlink radio resource 560 from the downlink radio resource 560, is likely to approximately match with a portion (hereinafter, referred to as an "SRS related portion") including in the frequency direction the transmission frequency band of the SRS transmitted by the target communication terminal 2 in the downlink radio resource 560. In the example shown in FIG. 12, the use downlink radio resources (600a and 600d), which is allocated to the communication terminal 2 of terminal number 1 from the first downlink radio resource 560a, approximately match with an SRS related portion in the first downlink radio resource 560a.

As described above, when determining the MCS to be applied to a transmission signal to be transmitted to the target communication terminal 2 by using the use downlink radio resource included in the downlink radio resource 560, the MCS determining section 126 acquires an average value (hereinafter, an "average SINR in the frequency band of the use downlink radio resource") of past SINRs in the plurality of RB bands included in the frequency band of the use downlink radio resource in the target communication terminal 2, and determines the MCS based on the average value. Since the use downlink radio resource, which is allocated to the target communication terminal 2 transmitting the SRS in the uplink radio resource for SRS corresponding to the downlink radio resource 560 from the downlink radio resource 560, is likely to approximately match with an SRS related portion of the downlink radio resource 560, the average value (hereinafter, referred to as an "average SINR in the SRS transmission band") of past SINRs in the plurality of RB bands (the plurality of RB bands included in the SRS transmission band 450 of the target communication terminal 2) included in the SRS related portion in the target communication terminal 2 is likely to approximately match with the average SINR in the frequency band of the use downlink radio resource. The MCS to be applied to the transmission signal to be transmitted in the use downlink radio resource is determined based on the average SINR in the frequency band of the use downlink radio resource, and the transmission throughput at the time when the communication section 13 performs the downlink communication by the MCS using the use downlink radio resource is determined. For this reason, it can be said that the average SINR in the frequency band of the use downlink radio resource represents the transmission throughput at the time when the communication section 13 performs the downlink communication using the use downlink radio resource.

Therefore, it can be considered that the average SINR in the SRS transmission band that is likely to approximately match with the average SINR in the frequency band of the use downlink radio resource represents the predicted value of the transmission throughput at the time when the communication section 13 performs the downlink communication using the use downlink radio resource.

In addition, as described above, an association table, which is used when the MCS to be applied to the transmission signal to the communication terminal 2 from the SINR in the communication terminal 2 is determined, is updated based on the reception error rate of the communication terminal 2. Therefore, even when the average SINR in the frequency band of the use downlink radio resource is uniform among the plurality of the communication terminals 2, the MCSs to be applied to the transmission signals to the communication terminals 2 do not always match with each other. That is to say, even when the average SINR in the frequency band of the use downlink radio resource is uniform among the plurality of the communication terminals 2, the transmission throughputs at the time when the base station 1 performs downlink communication with the communication terminal 2 using the use downlink radio resource do not always match with each other.

Thus, in this embodiment, the average value (the average SINR in the SRS transmission band 450 of the process target terminal 2) of past SINRs in the process target terminal 2 in the plurality of RB bands included in the SRS transmission band 450 of the process target terminal 2 is adjusted based on the reception error rate of the process target terminal 2. The adjusted average value is used as the instant transmission throughput index value T, which is the index value representing the predicted value of the transmission throughput of the communication section 13 at the time when the communication section 13 performs the downlink communication with the process target terminal 2 using the target allocation unit resource 700.

At step s4, the scheduling executing section 122 acquires an allocation evaluation value Y representing an allocation priority for allocating the target allocation unit resource 700 to the process target terminal 2 based on the transmission gain index value Z and the instant transmission throughput index value T acquired for the process target terminal 2. In this embodiment, the allocation evaluation value Y is acquired according to the following formula (3).

[Mathematical Formula 3]

$$Y = T - Z \quad (3)$$

When the transmission gain with respect to the process target terminal 2 at the time when the communication section 13 makes the array transmission control based on the use SRS so as to perform the downlink communication with the process target terminal 2 using the target allocation unit resource 700 is large, and when the transmission throughput of the communication section 13 at that time is small (the MCS rank is low), a possibility that a reception error occurs in the process target terminal 2 is decreased. On the other hand, even when the transmission gain with respect to the process target terminal 2 at the time when the communication section 13 makes the array transmission control based on the use SRS so as to perform the downlink communication with the process target terminal 2 using the target allocation unit resource 700 is large, and the large transmission throughput of the communication section 13 at that time (the MCS rank is high) increases the possibility that a reception error of a reception signal from the base station 1 occurs in the process target terminal 2.

In the above formula (3), since a value acquired by subtracting the transmission gain index value Z from the instant transmission throughput index value T is set as the allocation evaluation value Y, it can be said that as the allocation evaluation value Y is smaller, the possibility that the reception error occurs in the process target terminal 2 is decreased, and downlink communication performance of the communication section 13 at the time when the communication section 13 makes the array transmission control based on the use SRS and performs the downlink communication with the process target terminal 2 using the target allocation unit resource 700 is satisfactory. Therefore, as the allocation evaluation value Y is smaller, the priority of allocation of the target allocation unit resource 700 to the process target terminal 2 is higher.

When the scheduling executing section 122 acquires the allocation evaluation value Y of the process target terminal 2 at step s4, a determination is made at step s5 whether all the allocatable terminals 2 to which the target allocation unit resource 700 can be allocated are set as the process target terminals 2. When the determination is made at step s5 that not all the allocatable terminals 2 are set as the process target terminal 2, the scheduling executing section 122 again executes step s1, and one of the allocatable terminals 2 which is not yet the process target terminal 2 is set as the process target terminal 2. Thereafter, the scheduling executing section 122 executes steps s1 to s4 on the new process target terminal 2 so as to acquire the allocation evaluation value Y.

On the other hand, when the determination is made at step s5 that all the allocatable terminals 2 are set as the process target terminals 2, the scheduling executing section 122 specifies the allocatable terminal 2 in which the allocation evaluation value Y of the target allocation unit resource 700 is minimum at step s6. That is to say, the allocatable terminal 2 in which the allocation priority of the target allocation unit resource 700 is the highest is specified. As a result, when the communication section 13 makes the array transmission control based on the use SRS and performs the downlink communication using the target allocation unit resource 700, the communication terminal 2 in which the downlink communication performance of the communication section 13 is the best is specified. Thereafter, at step s7, the scheduling executing section 122 allocates the target allocation unit resource 700 to the allocatable terminal 2 specified at step s6 as the use downlink radio resource.

When the scheduling executing section 122 executes the unit resource allocating process as described above on each of the allocation unit resources 700 included in the downlink radio resource 560 composed of the first downlink radio resource 560*a*, the second downlink radio resource 560*b* and the third downlink radio resource 560*c* included in the target association unit period 550, like the example of FIG. 12, the use downlink radio resource is allocated to each of the communication terminals 2 transmitting the SRS in the target association unit period 550.

In the above example, the allocation evaluation value Y representing the allocation priority is acquired based on the transmission gain index value Z and the instant transmission throughput index value T, but the instant transmission throughput index value T may not be used, and the transmission gain index value Z may be used directly as the allocation evaluation value Y. In this case, as the allocation evaluation value Y is larger, the allocation priority becomes higher. The target allocation unit resource 700 is allocated as the use downlink radio resource to the allocatable terminal 2 whose allocation evaluation value Y is largest.

As described above, in the base station 1 according to the embodiment, when the use downlink radio resource (the allocation unit resource 700) including in the frequency direction the frequency band included in transmission frequency band of the SRS received in the uplink radio resource for SRS is allocated to the communication terminal 2 from the downlink radio resource 560 corresponding to the uplink radio resource for SRS, the array transmission control is made based on the SRS (use SRS) received in the frequency band of the use downlink radio resource in the uplink radio resource for SRS. As a result, the communication terminal 2 to which the use downlink radio resource is allocated is determined based on the predicted value (the transmission gain index value Z) of the transmission gain with respect to the communication terminal 2 at the time when the downlink communication is performed with the communication terminal 2 by using the use downlink radio resource. Therefore, the use downlink radio resource can be applied to the communication terminal 2 where the transmission gain may increase when the array transmission control is made based on the SRS received in the frequency band of the use downlink radio resource in the uplink radio resource for SRS and the downlink communication is performed by using the use downlink radio resource. Therefore, when the base station 1 performs the downlink communication with the communication terminal 2 using the use downlink radio resource, a transmission path gain can be acquired, and the transmission signal can be sent securely to the communication terminal 2. As a result, the transmission performance of the base station 1 is improved.

Further, in the unit resource allocating process according to the embodiment, in a case where the process target terminal 2 is the use SRS transmission terminal 2, when the communication section 13 makes the array transmission control based on the use SRS and performs downlink communication with the use SRS transmission terminal 2 using the target allocation unit resource 700, a beam relating to the transmission directivity of the array antenna 110 directs at the use SRS transmission terminal 2. For this reason, the transmission gain index value Z of the use SRS transmission terminal 2 tends to increase. Therefore, the allocation evaluation value Y of the use SRS transmission terminal 2 tends to decrease, and the target allocation unit resource 700 is easily allocated as the use downlink radio resource to the use SRS transmission terminal 2. As a result, as shown in FIG. 12, the use downlink radio resource, which is allocated to the target communication terminal 2 transmitting the SRS in the uplink radio resource for SRS from the downlink radio resource corresponding to the uplink radio resource for SRS, is likely to approximately match with the SRS related portion in the downlink radio resource. Therefore, when the base station 1 performs the downlink communication with the target communication terminal 2 using the use downlink radio resource, the beam relating to the transmission directivity of the array antenna 110 can direct at the target communication terminal 2 in the most part of the frequency band of the use downlink radio resource, and the neighboring base station 1 executes the SRS matching downlink allocating process so as to be capable of directing the null relating to the transmission directivity of the array antenna 110 at the communication terminal 2 to which the use downlink radio resource is allocated. As a result, the transmission performance of the base station 1 is improved.

In such a manner, in the base station 1 according to the embodiment, when the downlink communication with the communication terminal 2 is performed, the transmission path gain can be acquired, and the null can be directed to the communication terminal 2 communicating with the neighboring base station 1.

In a state that the transmission path characteristics in the downlink direction between the use SRS transmission terminal 2 and the communication section 13 in the frequency band of the target allocation unit resource 700 is not satisfactory, when the communication section 13 makes the array transmission control based on the use SRS and performs the downlink communication with the use SRS transmission terminal 2 using the target allocation unit resource 700, the beam directs at the use SRS transmission terminal 2, but the transmission gain index value Z of the use SRS transmission terminal 2 is decreased. In this case, therefore, the target allocation unit resource 700 is likely to be allocated as the use downlink radio resource to the communication terminals 2 other than the use SRS transmission terminal 2. In this case, therefore, the SRS non-matching downlink allocating process is executed on the target allocation unit resource 700, and as described with reference to FIG. 16, when the communication section 13 makes the array transmission control based on the use SRS so as to perform the downlink communication with the communication terminal 2 using the target allocation unit resource 700, the beam relating to the transmission directivity of the array antenna 110 cannot be intentionally directed at the communication terminal 2. Further, as described with reference to FIG. 17, the communication terminal 2 to which the use downlink radio resource is allocated by executing the SRS matching downlink allocating process by the neighboring base station 1, the null relating to the transmission directivity of the array antenna 110 can be directed. However, as described with reference to FIG. 16, the null cannot be intentionally directed at the communication terminal 2 to which the use downlink radio resource is allocated by executing the SRS non-matching downlink allocating process by the neighboring base station 1.

However, in this embodiment, even when the SRS non-matching downlink allocating process is executed on the target allocation unit resource 700, the target allocation unit resource 700 is allocated to the communication terminal 2 in which the transmission gain index value Z is large. For this reason, when the communication section 13 performs the downlink communication with the communication terminal 2 using the target allocation unit resource 700, even if the beam relating to the transmission directivity of the array antenna 110 does not intentionally direct at the communication terminal 2, the transmission signal can be securely sent from the base station 1 to the communication terminal 2.

Further, when the communication section 13 performs the downlink communication with the communication terminal 2 using the target allocation unit resource 700, even if the null relating to the transmission directivity of the array antenna 110 does not intentionally direct at the communication terminal 2 to which the use downlink radio resource is allocated by executing the SRS non-matching downlink allocating process by the neighboring base station 1, the interference to the communication terminal 2 can be repressed. This point is described below with reference to FIG. 21.

Figure 21:
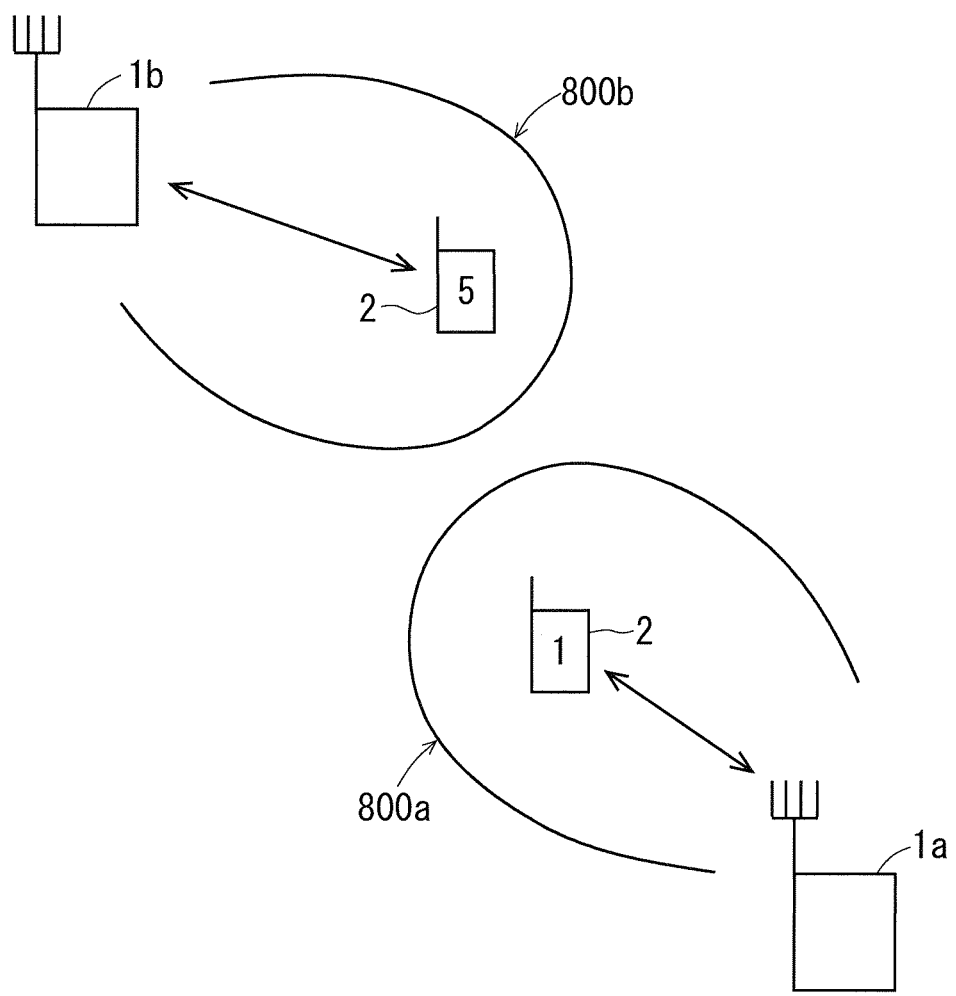
FIG. 21 is a diagram illustrating one example of the transmission directivity in the base station and the neighboring base station.

FIG. 21 illustrates the base station 1a, and the beam relating to the transmission directivity in the neighboring base station 1b around the base station 1a. FIG. 21 illustrates a beam 800a relating to the transmission directivity of the array antenna 110 at the time when the base station 1a performs the downlink communication with the communication terminal 2 of terminal number 1 in which the transmission gain index value Z in a certain allocation unit resource 700 allocated as the use downlink radio resource according to the SRS non-matching downlink allocating process is large. Further, FIG. 21 illustrates a beam 800b relating to the transmission directivity of the array antenna 110 at the time when the neighboring base station 1b performs the downlink communication with the communication terminal 2 of terminal number 5 to which the same allocation unit resource 700 as the certain allocation unit resource 700 is allocated as the use downlink radio resource according to the SRS non-matching downlink allocating process using the allocation unit resource 700.

In the example of FIG. 21, since the transmission gain index value Z of the communication terminal 2 of terminal number 1 is large, the transmission path characteristics between the base station 1a and the communication terminal 2 of terminal number 1 in the frequency band of the use downlink radio resource is satisfactory. Therefore, the communication terminal 2 of terminal number 1 is likely to be present on a position which is hardly interfered by each of the communication terminals 2 communicating with the neighboring base station 1b, namely, a position separated from each of the communication terminals 2 communicating with the neighboring base station 1b. Therefore, the communication terminal 2 of terminal number 1 is likely to be present on a position that is separated from the communication terminal 2 of terminal number 5 performing the downlink communication with the neighboring base station 1b. Therefore, when the base station 1a transmits a signal to the communication terminal 2 of terminal number 1, even if the null relating to the transmission directivity of the base station 1a is not directed at the communication terminal 2 of terminal number 5 communicating with the neighboring base station 1b, as shown in FIG. 21, the possibility that the beam 800a relating to the transmission directivity of the base station 1a is not sent to the communication terminal 2 of terminal number 5 is increased. Therefore, when the base station 1a performs the downlink communication with the communication terminal 2 of terminal number 1, even if the null cannot be intentionally directed at the communication terminal 2 of terminal number 5 communicating with the neighboring base station 1b, an influence of the interference to the communication terminal 2 of terminal number 5 is considered to be small.

Further, in this embodiment, since the communication terminal 2 to which the use downlink radio resource is allocated is determined for each of the allocation unit resource 700, namely, the communication terminal 2 to which the allocation unit resource 700 is allocated is determined for each of the plurality of the allocation unit resources 700 included in the downlink radio resource 560 based on the transmission gain index value Z, unlike the example of FIG. 15, the use downlink radio resource including the plurality of the allocation unit resource 700 whose transmission path characteristics are satisfactory can be allocated from the downlink radio resource 560 to one communication terminal 2. Therefore, the transmission path characteristics are satisfactory in the entire frequency band of the use downlink radio resource to be allocated to the communication terminal 2, and the MCS to be applied to transmission signal to be transmitted by using the use downlink radio resource can be upgraded. As a result, the transmission throughput of the base station 1 is improved, and the transmission performance of the base station 1 is improved.

Further, in this embodiment, when the use downlink radio resource is allocated to the communication terminal 2, the communication terminal 2 to which the use downlink radio resource is allocated is determined based on not only the transmission gain index value Z but also the instant transmission throughput index value T. For this reason, when the base station 1 performs the downlink communication with the communication terminal 2 using the use downlink radio resource, the possibility that a reception error occurs in the communication terminal 2 can be reduced.

VARIOUS MODIFIED EXAMPLES

First Modified Example

Figure 22:
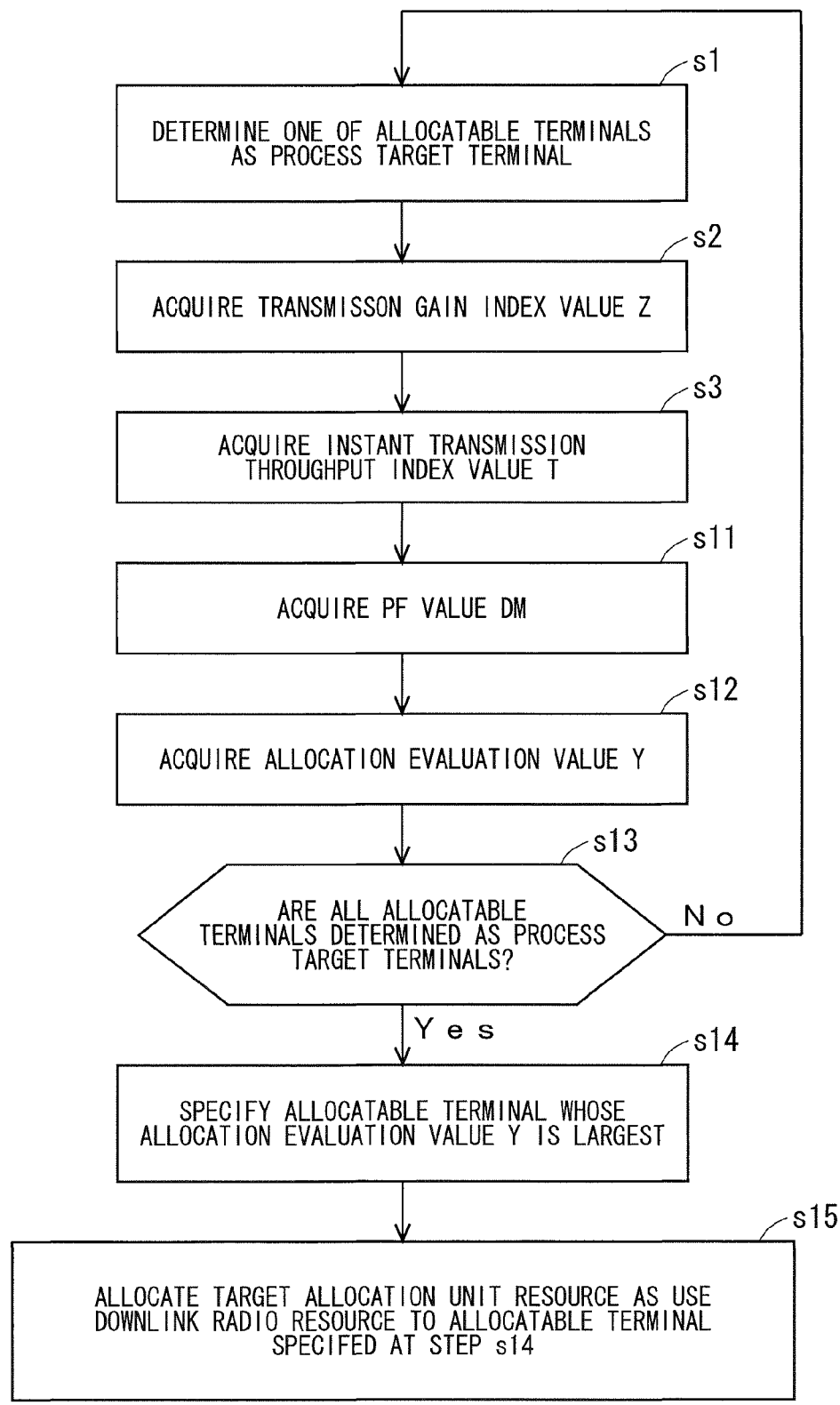
FIG. 22 is a flowchart illustrating a modified example of the unit resource allocating process in the base station.

In the above example, the allocation evaluation value Y representing the priority of the allocation of the target allocation unit resource 700 to the process target terminal 2 is determined based on the transmission gain index value Z and the instant transmission throughput index value T, but it may be determined based on an evaluation value DM (hereinafter, referred to as "PF value DM") for determining the communication terminal 2 to which the use downlink radio resource is allocated also based on proportional fairness. FIG. 22 is a flowchart illustrating the unit resource allocating process according to a modified example.

As shown in FIG. 22, steps s1 to s3 are executed, and the transmission gain index value Z and the instant transmission throughput index value T of the process target terminal 2 are acquired.

Next, at step s11, the scheduling executing section 122 acquires the PF value DM of the process target terminal 2 in the target allocation unit resource 700.

The PF value DM(n) of the process target terminal 2 in the target allocation unit resource 700 included in the n-th association unit period 550 can be expressed by the following formula (4).

[Mathematical Formula 4]

$$DM(n)=Z(n)/TD(n) \tag{4}$$

Z(n) indicates the transmission gain index value Z of the process target terminal 2 in the target allocation unit resource 700 included in the n-th association unit period 550.

Further, TD(n) indicates an average transmission performance of the base station 1 with respect to the process target terminal 2 in the target allocation unit resource 700 in up to the n-th association unit period 550, and it is expressed by the following formula (5).

[Mathematical Formula 5]

$$TD(n)=(1-1/Tc)\times TD(n-1)+1/Tc\times Z(n-1) \tag{5}$$

Tc represents a constant called a forgetting factor. Further, when the target allocation unit resource 700 is not used for the downlink communication between the base station 1 and the process target terminal 2 in the (n−1) association unit period 550, Z(n−1) becomes zero.

As is understood from the formulas (4) and (5), the PF value DM of the process target terminal 2 becomes larger as the transmission capacity at that time is higher, and the PF value DM becomes higher as the past average transmission capacity is lower, namely, a data amount of the past downlink communication data is smaller. While fairness of the downlink communication data amount is being maintained among the plurality of the communication terminals 2 by incorporating the PF value DM into the allocation evaluation value Y, the transmission throughput of the base station 1 can be improved.

At next step s12, the scheduling executing section 122 acquires the allocation evaluation value Y representing the priority of the allocation of the target allocation unit resource 700 to the process target terminal 2 based on the acquired transmission gain index value Z, the instant transmission throughput index value T and the PF value DM of the process target terminal 2. In the modified example, the allocation evaluation value Y is acquired by using the following formula (6).

[Mathematical Formula 6]

$$Y=\beta \times DM-(T-Z) \tag{6}$$

β represents an adjustment constant for making the unit of the PF value DM match with units of the transmission gain index value Z and the instant transmission throughput index value T.

As expressed by the formula (6), the allocation evaluation value Y according to the modified example is acquired by subtracting the allocation evaluation value Y expressed by the formula (3) from the PF value DM (accurately, the PF value DM multiplied by the adjustment constant β).

The allocation evaluation value Y according to the modified example becomes larger as the PF value DM is larger, and it becomes larger as the instant transmission throughput index value T is smaller, and it becomes larger as the transmission gain index value Z is larger. Therefore, as the allocation evaluation value Y is larger, the priority of the allocation of the target allocation unit resource 700 to the process target terminal 2 is higher.

When the scheduling executing section 122 acquires the allocation evaluation value Y of the process target terminal 2 at step s12, it determines at step s13 whether all the allocatable terminals 2 to which the target allocation unit resource 700 can be allocated are set as the process target terminals 2. When the determination is made at step s13 that not all the allocatable terminals 2 are set as the process target terminals 2, the scheduling executing section 122 again executes step s1, and sets one of the allocatable terminals 2 that are not yet set as the process target terminal 2 as the process target terminal 2. Thereafter, the scheduling executing section 122 executes steps s1 to s3, s11 and s12 on the new process target terminal 2 so as to acquire the allocation evaluation value Y.

On the other hand, the determination is made at step s13 that all the allocatable terminals 2 are set as the process target terminal 2, the scheduling executing section 122 specifies the allocatable terminal 2 in which the allocation evaluation value Y of the target allocation unit resource 700 is largest at step s14. That is to say, the allocatable terminal 2 in which the allocation priority of the target allocation unit resource 700 is the highest is specified. Thereafter, at step s15, the scheduling executing section 122 allocates the target allocation unit resource 700 as the use downlink radio resource to the allocatable terminal 2 specified at step s14.

In such a manner, in the modified example, since the communication terminal 2 to which the use downlink radio resource is allocated is determined also based on the PF value DM, while the fairness of the allocation of downlink radio resource is being maintained among the plurality of the communication terminals 2 communicating with the base station 1, the transmission performance of the base station 1 can be improved.

Second Modified Example

The communication terminal 2 to which the target allocation unit resource 700 is allocated may be determined based on the PF value DM according to a method different from that in the first modified example.

For example at step s6 in the flowchart shown in FIG. 18, when the allocatable terminal 2 in which the allocation evaluation value Y expressed by the formula (3) is smallest is specified, the PF value DM of the allocatable terminal 2 is acquired. When the PF value DM is larger than a threshold, the target allocation unit resource 700 is allocated as the use downlink radio resource to the allocatable terminal 2 in which the allocation evaluation value Y is smallest. On the other hand, when the PF value DM of the allocatable terminal 2 whose allocation evaluation value Y is smallest is not more than threshold, the PF value DM of the allocatable terminal 2 whose allocation evaluation value Y is second smallest is acquired. When the PF value DM is larger than the threshold, the target allocation unit resource 700 is allocated to the allocatable terminal 2. When the PF value DM of the allocatable terminal 2 whose allocation evaluation value Y is second smallest is not more than the threshold, the PF value DM of the allocatable terminal 2 whose allocation evaluation value Y is third smallest is acquired, and the similar process is repeated thereafter. When the allocatable terminal 2 whose the PF value DM is larger than the threshold is not present, the target allocation unit resource 700 is allocated to the allocatable terminal 2 whose allocation evaluation value Y is smallest.

Even in such a case, the similar effect to the first modified example can be acquired. Further, in comparison with the first modified example, since not all the PF values DM of all the allocatable terminals 2 should be necessarily acquired, the unit resource allocating process is simplified.

Third Modified Example

In the first modified example, the allocation evaluation value Y is acquired by using the transmission gain index value Z, the instant transmission throughput index value T and the PF value DM, but the PF value DM may be directly used as the allocation evaluation value Y. In this case, similarly to the first modified example, as the allocation evaluation value Y (the PF value DM) is larger, the allocation priority of the allocation of the target allocation unit resource 700 to the process target terminal 2 is higher. Even in this case, while the fairness of the allocation of the downlink radio resources is maintained among the plurality of the communication terminals 2 communicating with the base station 1, the transmission performance of the base station 1 can be improved.

Fourth Modified Example

In the above example, a value, which is acquired by adjusting the average value of the past SINRs in the process target terminal 2 in the plurality of RB bands included in the SRS transmission band 450 of the process target terminal 2 based on the reception error rate of the process target terminal 2, is used as the instant transmission throughput index value T. However, instead of this value, the rank of the MCS to be applied to the transmission signal to be transmitted in the SRS transmission band 450 is acquired based on the average value of the SINRs and the MCS rank may be used as the instant transmission throughput index value T. In this case, the MCS corresponding to the average value of the SINRs is specified with reference to the association table of the process target terminal 2, and the rank of the specified MCS is used as the instant transmission throughput index value T. Further, the MCS rank according to the transmission gain index value Z acquired by using the formula (1) is specified, and the MCS rank is used as the transmission gain index value Z to be used for the calculation of the allocation evaluation value Y.

Fifth Modified Example

When the target allocation unit resource 700 is allocated as the use downlink radio resource to the use SRS transmission terminal 2, the communication section 13 makes the array transmission control based on the use SRS so as to perform the downlink communication with the use SRS transmission terminal 2 using the target allocation unit resource 700. In this case, the beam relating to the transmission directivity of the array antenna 110 can be directed at the use SRS transmission terminal 2, and the neighboring base station 1 executes the SRS matching downlink allocating process so that the null relating to transmission directivity of the array antenna 110 can be directed at the communication terminal 2 to which the use downlink radio resource is allocated. Therefore, from a viewpoint of the array transmission control, it is desirable that the target allocation unit resource 700 is allocated to the use SRS transmission terminal 2 as much as possible.

Therefore, when the process target terminal 2 is the use SRS transmission terminal 2, an offset value γ may be added to the allocation evaluation value Y of the process target terminal 2 so that the target allocation unit resource 700 is likely to be allocated to the process target terminal 2.

For example, when the allocation evaluation value Y expressed by the formula (3) is used, a minus offset value γ is added to the allocation evaluation value Y. Further, when the allocation evaluation value Y according to the first to third modified examples is used, a plus offset value γ is added to the allocation evaluation value Y. As a result, the target allocation unit resource 700 is allocated to the use SRS transmission terminal 2 more easily, and the array transmission control can be made more suitably.

Sixth Modified Example

At step s6 shown in FIG. 18, the allocatable terminal 2 whose allocation evaluation value Y is smallest, namely, the allocatable terminal 2 in which the possibility that a reception error occurs is lowest is specified, but the allocatable terminal 2 whose allocation evaluation value Y is smaller than θ, namely, the allocatable terminal 2 in which the possibility that a reception error occurs is low to a certain extent may be specified. In this case, at step s7, the target allocation unit resource 700 is allocated as the use downlink radio resource to the allocatable terminal 2 in the allocatable terminals 2 in which the possibility that a reception error occurs is low to a certain extent, in which the predicted value of the transmission throughput at time when the base station 1 performs the downlink communication using the downlink radio resource 560 including the target allocation unit resource 700 is largest.

As described above, the use downlink radio resource, which is allocated to the target communication terminal 2 to transmit SRS in the uplink radio resource for SRS corresponding to the downlink radio resource 560 from the downlink radio resource 560, is likely to approximately match with a portion which includes in the frequency direction the transmission frequency band of the SRS to be transmitted by the target communication terminal 2 in the downlink radio resource 560. Therefore when the base station 1 performs the downlink communication with a certain allocatable terminal 2 using the downlink radio resource 560 including the target allocation unit resource 700, the predicted value of the transmission throughput can be acquired based on the instant transmission throughput index value T of the allocatable terminal 2 (in the embodiment, the value acquired by adjusting the average value of the SINRs using the reception error rate, and the MCS rank in the fourth modified example), and the number of the RB bands included in the transmission frequency band of the SRS to be transmitted by the allocatable terminal 2 using the uplink radio resource for SRS associated with the downlink radio resource 560. For example, the value, which is acquired by the instant transmission throughput index value T and the number of the RB bands are multiplied by each other, is used as the predicted value of the transmission throughput.

In such a manner, the target allocation unit resource 700 is allocated as the use downlink radio resource to the allocatable terminal 2 in the allocatable terminals 2 in which the possibility that a reception error occurs is low to a certain extent, in which the predicted value of the transmission throughput at time when the base station 1 performs the downlink communication using the downlink radio resource 560 including the target allocation unit resource 700 is largest, so that the transmission throughput of the base station 1 can be increased while the possibility that a reception error occurs in the communication terminal 2 is being repressed.

Other Modified Examples

In the above example, the three uplink radio resources for SRS including the first uplink radio resource for SRS 500a, the second uplink radio resource for SRS 500b and the third uplink radio resource for SRS 500c are used for the transmission of the SRS, but only two of the uplink radio resources for SRS may be used for the transmission of the SRS. In this case, one of the uplink radio resources for SRS to be used for the transmission of the SRS is associated with one of the downlink radio resources 560 including the first downlink radio resource 560a, the second downlink radio resource 560b and the third downlink radio resource 560c, and the other one of the uplink radio resources for SRS to be used for the transmission of the SRS is associated with the downlink radio resources composed of the residual two downlink radio resources 560.

Further, only one uplink radio resource for SRS in the first uplink radio resource for SRS 500a, the second uplink radio resource for SRS 500b and the third uplink radio resource for SRS 500c may be used for the transmission of the SRS. In this case, the one uplink radio resource for SRS to be used for the transmission of the SRS is associated with the downlink radio resources composed of the first downlink radio resource 560a the second downlink radio resource 560b and the third downlink radio resource 560c.

In the above example, the SRS to be transmitted in the uplink pilot time slot 352 of the special sub-frame 302 is used for the array transmission control, but the SRS to be transmitted in the last symbol period 304 of the uplink sub-frame 302 may be used instead of or together with the SRS. In this case, in the uplink sub-frame 302, when the uplink radio resource specified by the last symbol period 304 and the plurality of sub-carriers SC0 of the comb-shape that can be used for the transmission of the SRS0 is set as the uplink radio resource for SRS, similarly to the above, the unit resource allocating process can be executed. Further, in the uplink sub-frame 302, when the uplink radio resource specified by the last symbol period 304 and the plurality of sub-carriers SC0 of the comb-shape that can be used for the transmission of the SRS1 is set as the uplink radio resource for SRS, similarly to the above, the unit resource allocating process can be executed.

Although the present invention is applied to LTE in the aforementioned examples, the present invention may be applied to other communication systems.

While the invention has been described in detail, the foregoing description is in all aspects illustrative and not restrictive. It is understood that numerous other modified examples and variations which have not been illustrated can be devised without departing from the scope of the invention.

REFERENCE SIGNS LIST 1 base station
2 communication terminal 13 communication section
110a antenna
122 scheduling executing section
126 MCS determining section

The invention claimed is:

1. A base station for communicating with a communication terminal comprising: a communication section for communicating with a communication terminal using a plurality of antennas and controlling transmission directivity in the plurality of antennas when downlink communication with a communication terminal is performed; and
 a scheduling executing section for determining a communication terminal for downlink communication and allocating a use downlink radio resource to be used by the communication section for the downlink communication with the communication terminal to the communication terminal,
wherein, an uplink radio resource for a known signal which is capable of being used when a communication terminal transmits a known signal, and a downlink radio resource, which is associated with the uplink radio resource for the known signal and is capable of being used when the communication section performs downlink communication with a communication terminal are determined,
wherein, when the scheduling executing section allocates, to a communication terminal, the use downlink radio resource including in a frequency direction a frequency band included in a transmission frequency band of the known signal received by at least a part of the uplink radio resource for the known signal, the scheduling executing section executes an allocating process for allocating the use downlink radio resource from the downlink radio resource associated with the uplink radio resource for the known signal to the communication terminal,
wherein, when the communication section performs the downlink communication with a communication terminal using the use downlink radio resource which is allocated to the communication terminal by executing the allocating process by the scheduling executing section, the communication section controls the transmission directivity in the plurality of antennas based on the known signal to be received in the frequency band of the use downlink radio resource in the uplink radio resource for the known signal,
wherein, when the scheduling executing section allocates the use downlink radio resources to a communication terminal in the allocating process, the scheduling executing section calculates a predicted value of a transmission gain at a time when the communication section controls the transmission directivity in the plurality of antennas based on the known signal to be received in the frequency band of the use downlink radio resource in the uplink radio resource for the known signal and performs the downlink communication with the communication terminal, and determines a communication terminal to which the use downlink radio resource is allocated based on the predicted value.

2. The base station according to claim 1,
wherein, when the use downlink radio resource is allocated to a communication terminal in the allocating process, the scheduling executing section calculates a predicted value of a transmission throughput at a time when the communication section communicates with the communication terminal using the use downlink radio resource, and determines a communication terminal to which the use downlink radio resource is allocated based on the predicted value of the transmission throughput and the predicted value of the transmission gain.

3. The base station according to claim 1,
wherein, when the use downlink radio resource is allocated to the communication terminal in the allocating process, the scheduling executing section calculates, using the predicted value of the transmission gain, an evaluation value for determining a communication terminal to which the use downlink radio resource is allocated based on proportional fairness, and determines a communication terminal to which the use downlink radio resource is allocated based on the evaluation value.

4. The base station according to claim 1,
wherein, in the allocating process, the scheduling executing section determines a communication terminal to which the use downlink radio resource is allocated for each allocation unit of the downlink radio resource.

5. The base station according to claim 4 further comprising:
 an MCS determining section for determining an MCS (Modulation and Coding Scheme) to be applied to a transmission signal to be transmitted to a communication terminal by the communication section,
wherein, the MCS determining section determines one MCS to be applied to the transmission signal to be transmitted in the use downlink radio resource, to be allocated to a communication terminal in the allocating process by the scheduling executing section, including a plurality of allocation units based on transmission path characteristics in the downlink direction between the communication terminal and the communication section in the entire frequency band of the use downlink radio resource.

* * * * *